United States Patent [19]

Nagano

[11] Patent Number: 4,626,928
[45] Date of Patent: Dec. 2, 1986

[54] ORTHOGONAL PHASE MODULATION AND DEMODULATION METHODS

[75] Inventor: Masahiko Nagano, Minami-ashigara, Japan

[73] Assignee: Fuji Photo Film Co., Ltd., Kanagawa, Japan

[21] Appl. No.: 519,730

[22] Filed: Aug. 2, 1983

[30] Foreign Application Priority Data

Aug. 9, 1982 [JP] Japan ............... 57-137375
Sep. 20, 1982 [JP] Japan ............... 57-162183
Jun. 13, 1983 [JP] Japan ............... 58-104104
Jun. 13, 1983 [JP] Japan ............... 58-104106

[51] Int. Cl.$^4$ .............................. H04N 9/493
[52] U.S. Cl. ............... 358/310; 358/12; 358/23; 329/50; 360/29
[58] Field of Search ............ 358/310, 314, 328, 12, 358/15, 16, 21 R, 23, 25, 39, 40; 360/29, 33.1; 329/50

[56] References Cited

U.S. PATENT DOCUMENTS 3,591,707 7/1971 Abbott ..................... 358/23
3,646,252 2/1972 Verstraelen et al. ......... 358/23 X
4,412,181 10/1983 Marguinaud et al. ......... 329/50

Primary Examiner—Robert L. Richardson

[57] ABSTRACT

In an orthogonal phase modulation method the first and second carriers perpendicular to each other are PM modulated by one of the two color signals or of the two luminance signals, at least one of the four signals consisting of two PM signals, the first and the second carriers are inverted or phase-shifted per 1 horizontal scanning period in such a way that these two PM signals will become phase-shifted by 180 degrees relative to each other per one horizontal scanning period by the time these two PM signals reach their inputs, and these PM signals phase-shifted by 180 degrees relative to each other are multiplexed for inputs in said input means. In a demodulation method, PM signals multiplexed by the PM modulation method are delayed by 1 horizontal scanning period and separated into two PM signals by addition and subtraction before and after the delay, and then the thus separated respective PM signals are PM demodulated by phase-shifting the phase reference signals similarly as in the modulation method.

74 Claims, 29 Drawing Figures

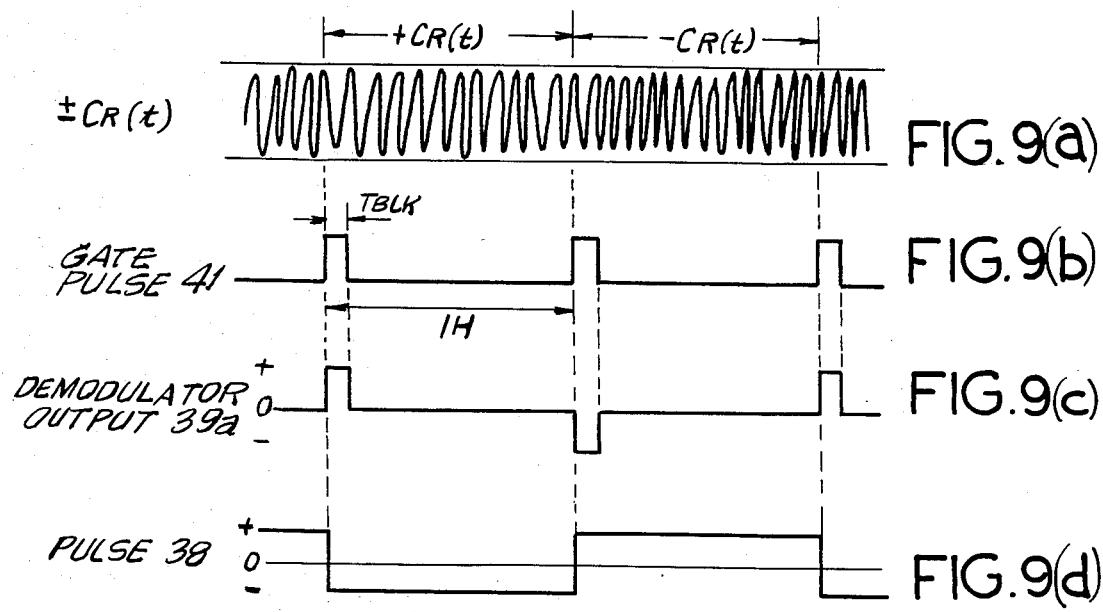
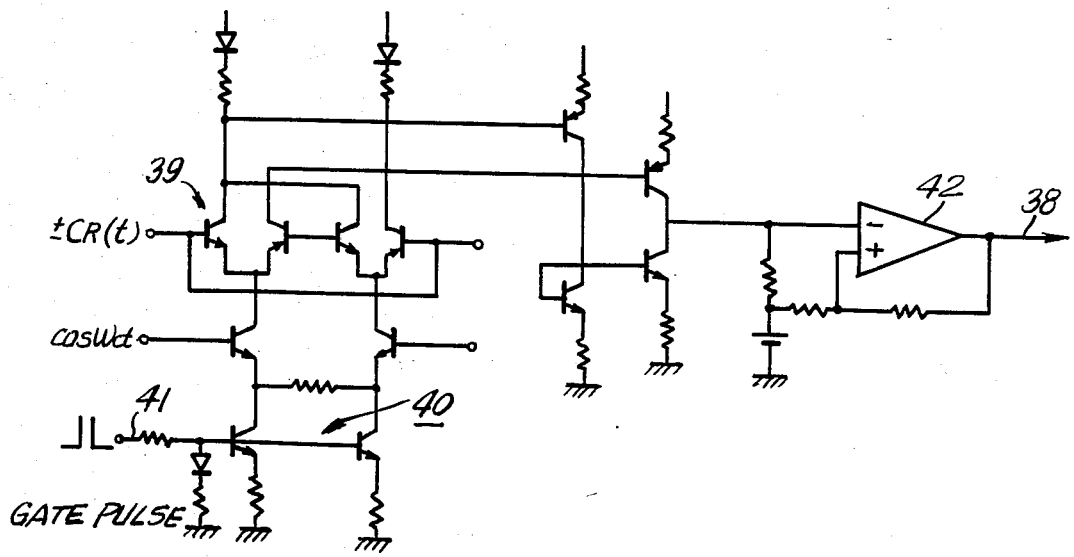
FIG. 10

ORTHOGONAL PHASE MODULATION AND DEMODULATION METHODS

BACKGROUND OF THE INVENTION

(1) Field of the Invention

The present invention concerns an orthogonal phase modulation method and its demodulation method. In further detail, it concerns a method of modulating and transmitting or storing in an arbitrary system such as on a magnetic recording medium two color signals or two separate luminance signals which will not extend the overall width of its occupied band, which is free of data missing and AM noise effects, and a demodulation method therefor. Accordingly, the present invention is most useful not only for transmission of color picture image signals but also for obtaining high quality pictures in an arbitrary storage of picture image data, such as video recording of moving or still pictures.

(2) Description of the Prior Art

In video recording using magnetic tapes and discs of the prior art, luminance signals were frequency modulated (FM), and two color signals were either amplitude modulated or alternately (line sequentially) FM modulated by 1 horizontal scanning period (1H), and these FM luminance signals and two AM color signals or line sequential FM color signals were recorded by multiplexing on a magnetic medium. In recent years, a method of recording luminance signals by phase modulating the same (PM modulation recording system) was disclosed in Japanese Patent Publication No. 56-51406 and Japanese Patent Application Lay-open Print No. 53-41126.

The PM modulation system mentioned above is intended for high density recording of movie pictures (moving picture images), and is advantageous in that demodulation is carried out without cross talk despite the high density recording without guard band or by partial overwriting at the time of recording, or tracking errors at the time of reproducing. This method is outlined in the following paragraphs (1) to (5).

(1) The carrier to be modulated by the luminance signals is synchronized with the relative movement between the magnetic medium and the magnetic head, (2) the modulation index mp is controlled to be 1.3 radian or less and the carrier is PM modulated by luminance signals, and (3) these PM luminance signals are recorded in such a way that the positions of the vertical and horizontal synchronizing signals in the adjacent tracks become aligned with each other in a direction at right angles to the length of said track and such that the carrier phases in the adjacent tracks will also become aligned.

When PM modulation recording is thus performed, (4) the carrier component amplitudes recorded in respective tracks are substantially the same because $mp \leq 1.3$ and the carrier components in the reproduced signals become constant even though the magnetic head overrides the adjacent tracks because the components are of the same phase among tracks.

(5) Because $mp \leq 1.3$, components of more than secondary side bands may be disregarded; and because synchronous signals are aligned between tracks, the side band components of the regenerated signals merely become the composite of plural frames or fields even when the magnetic head overrides the adjacent tracks at the time of reproduction. Therefore, there arises no difficulty for the movie since it is a composite of strongly correlated picture images. On the other hand, the FM recording system discussed above employs the so-called tilted azimath system where azimath is varied by the adjacent tracks for a high density recording.

As described above, various methods are employed in the prior art for high density recording, but they were insufficient in the picture quality particularly in video recording of still picture images.

For high quality video recording, wide band zones should be respectively allotted a luminance signal (Y) and two color signals (C) for modulation. However, there are two kinds of color signals, for example two color difference signals R−Y and B−Y, which must be detected independently in regeneration, thereby creating various difficulties.

We shall now explain representative examples (i), (ii) and (iii) of the color signal modulation method.

(i) A recording method of allotting to two color difference signals, R−Y and B−Y, zones which are separable from each other as shown in FIG. 1(a), and FM modulating the same. Because of the upper limit in frequency characteristics of a magnetic record, when independent exclusive zones for modulation are allotted to the luminance signal and two color signals, the zone occupied by respective signals in the overall frequency zone necessarily becomes narrow, thus deteriorating the picture quality.

(ii) A recording method of FM modulation which is also called the line sequential recording system wherein color difference signals of R−Y and B−Y are alternately switched by 1 H to be allotted to one exclusive zone. Although said zones of each signal become larger within the limited area, the picture quality also deteriorates because both R−Y and B−Y miss ½ of the color data.

(iii) A recording method by balanced modulation (BM) which is a kind of AM modulation to BM modulate the two carriers having the same frequency but phases different by 90 degrees by the color difference signals of R−Y and B−Y. The zones occupied by each of the color signals are large because two color signals are allotted to the same zone, and there are no color data missing. However, because it is an AM system, the picture quality becomes inferior due to AM noises caused by changes of the touch of a magnetic head in recording/reproducing. This inferior picture quality presents problems in visual characteristics when recording/transmitting still picture images.

SUMMARY OF THE INVENTION

In order to obviate the problems and difficulties of the prior art mentioned above, the inventor of the present invention has succeeded in developing a modulation method which does not require extending of the overall occupied band, does not miss color data, and yet is capable of eliminating AM noises and suitable for high quality recording. This system records the two color signals by orthogonal phase modulation (hereinafter referred to as rectangular 2-phase PM modulation method), and is outlined below in (a)–(d).

(a) The first and the second subcarriers of the same frequency perpendicular to each other are PM modulated by each one of the two color signals of color picture image signals. As for luminance signals, the main carrier is PM or FM angle-modulated. This will achieve angle modulation of all the respective signals, AM noises can be removed by passing them through an amplitude limiter. Since color signals are subjected to orthogonal phase PM modulation, two PM color signals occupy the same frequency zone as shown in FIG. 2, and therefore the occupied zone for respective signals becomes larger even in the limited frequency zone. Naturally, there are no color data missing.

However, if two PM color signals are multiplexed and recorded simply, the DC component remains in the demodulation output at the time of reproduction because of the 90° phase difference between the carrier and the primary signal of the PM modulated signal.

(b) At least one of the two PM color signals, the first subcarrier and the second subcarrier, is inverted or phase-shifted per every 1 H, and the two PM color signals are processed so as to phase-shift by 180° relatively per every 1 H in the process of recording.

(c) When such a process is performed, multiplexed PM color signals may be delayed by 1 H at the time of reproduction, separated into two PM color signals by addition and subtraction of the signals before and after 1 H delay; and then each of the PM color signals is demodulated by phase reference signal phase-shifting similar to the phase shift at the time of recording, thereby enabling a complete demodulation without a DC residual component. Separation by addition/subtraction of PM color signals utilizes the fact that color signals of color picture image signals have a strong vertical correlation among horizontal scanning lines.

(d) In orthogonal phase modulation of color signals, a circuit may be constructed simply by using a balanced modulator. Demodulation can also be conveniently conducted by using a balanced modulator. Any PM demodulation method can naturally be employed just as any PM modulation method can be employed for recording.

The above explanation is based on the premise that color picture image signals are recorded on magnetic tapes and discs, but the same is true of transmission systems where signals are transmitted by wire without magnetic recording and then demodulated, or of any other type of picture data storage system. Since a wider frequency band can be taken for the transmission systems, etc. for example two color difference signals of $(R-Y)_A$ & $(B-Y)_A$, and $(R-Y)_B$ & $(B-Y)_B$, and two luminance signals of $Y_A$ and $Y_B$ may be multiplexed by orthogonal phase modulation against two color picture image signals A and B as shown in FIG. 3. Naturally, magnetic recording can also do this.

BRIEF DESCRIPTION OF THE DRAWINGS

FIG. 9, consisting of (a)-(d), explains the inversion control for phase reference signals;

FIG. 10 shows a concrete circuit diagram thereof;

DESCRIPTION OF THE PREFERRED EMBODIMENTS

The present invention is explained in further detail by referring to a concrete circuit example. There is shown a recording system in FIG. 4 which uses a magnetic disc as a magnetic medium and records luminance signals by FM modulation, and a reproducing system corresponding thereto in FIG. 5.

Figure 4:
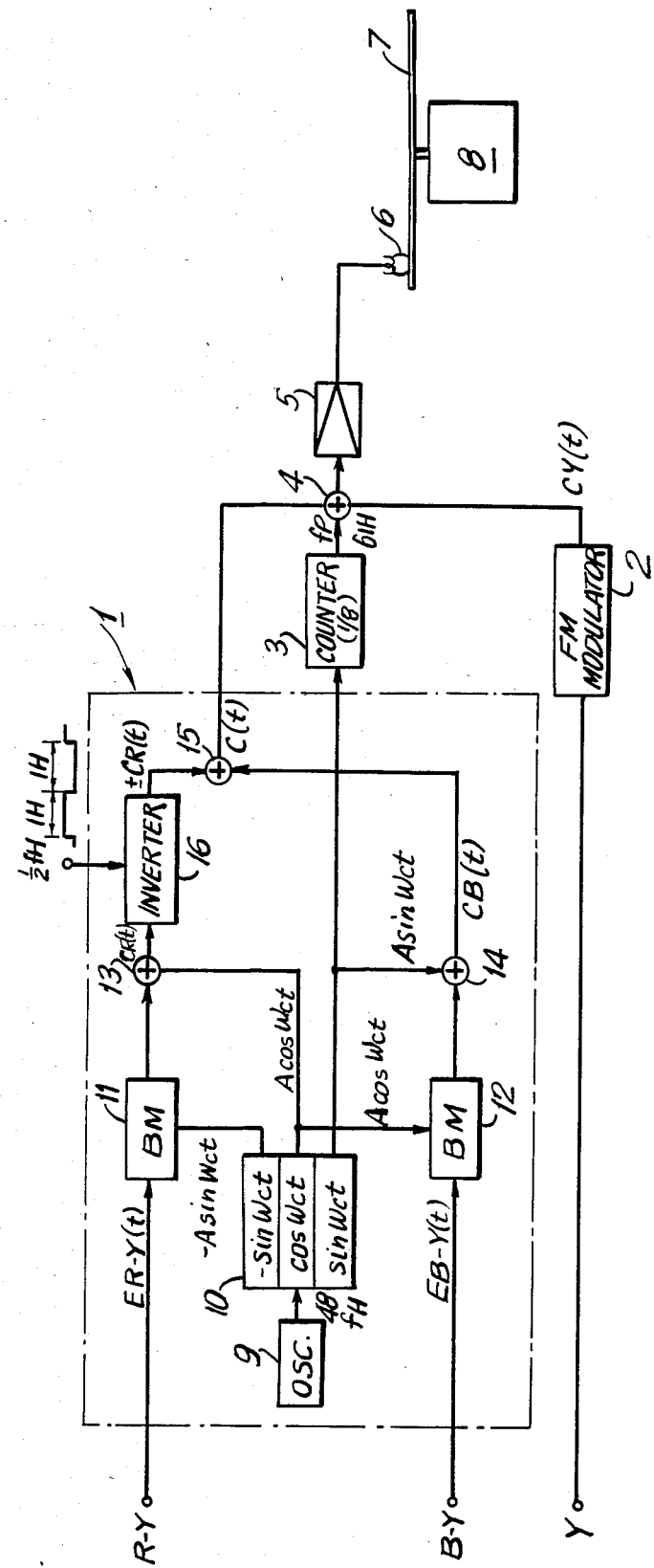
FIG. 4 is a block diagram showing one embodiment of the recording system.

In FIG. 4, the reference numeral 1 denotes an orthogonal phase modulation circuit, 2 an FM circuit for luminance signals, 3 a counter for forming reference signals, 4 a composite circuit, 5 a recording amplifier, 6 a magnetic head, 7 a magnetic disc, and 8 a driving motor. Circuit 1 comprises a carrier oscillator 9, a phase shifter 10, two balanced modulators 11, 12, composite circuits 13, 14, 15 and an inversion circuit 16. From the output (assuming $f_H$ to be the horizontal scanning frequency, e.g. 756 KHz corresponding to 48 $f_H$), of the oscillator 9, three different carriers of A cos $\omega_c t$, A sin $\omega_c t$, and $-$A sin $\omega_c t$ are formed by the phase shifter 10. To one of the balanced modulators 11 are input, for instance, the color difference signals R$-$Y and $-$A sin $\omega_c t$ to output balanced modulation signals, to which is added A cos $\omega_c t$ as a subcarrier in order to obtain R$-$Y carrier chrominance signals or PM color signals $C_R(t)$. To the other balanced modulator 12 are input B$-$Y color signals and A cos $\omega_c t$ to output balanced modulation signals, to which is added A sin $\omega_c t$ as a subcarrier to obtain B$-$Y PM color signals $C_B(t)$. Of the PM color signals thus obtained, e.g. $C_R(t)$ may be input in the inversion circuit 16 to output an alternately inverted PM color signal $\pm C_R(t)$ which is phase-inverted (by 180°) per 1 H by controlling with a rectangular wave of $\frac{1}{2} f_H$. PM color signal C(t) is formed by composing and multiplexing $\pm C_R(t)$ and $C_B(t)$, to which are added by frequency-multiplexing FM luminance signals $C_Y(t)$ consisting of luminance signals Y which have been FM modulated and the reference signal $f_p$ of 6 $f_H$ obtained by dividing the carrier to, for instance, 8 at the counter 3, and finally recording the same in the magnetic disc 7. The recording track generally is shaped concentrically in still video recording, and spirally in the movie recording. The recording modes employed are: rotating, for instance, the magnetic disc at 1,800 rpm in NTSC to record 1 track/1 frame; and rotating at 3,600 rpm to record 1 track/1 field or 2 tracks/1 frame.

We shall now explain the principle of PM modulation by using a balanced modulator. Supposing the carrier is A cos $\omega_c t$, modulation signal f(t), and disregarding the constant, PM signal C(t) which has been phase modulated becomes the following equation:

$$C(t) = A \cos[\omega_c t + K \cdot f(t)] \quad (1)$$

wherein K is a constant.

If $K \cdot f(t) << 1$ at all times t, the equation (1) becomes the following:

$$C(t) = A \cos \omega_c t - A \cdot K \cdot f(t) \sin \omega_c t \quad (2)$$

wherein the first term represents a carrier and the second term a balanced modulation wave. Accordingly, the range of $K \cdot f(t) << 1$ may be PM modulated by using a balanced modulator, indicating that side band waves of over secondary order are negligible. Conditions for holding $K \cdot f(t) << 1$ are now studied:

$$f(t) = a \cdot \sin \omega_m t \quad (3)$$

and when this is substituted in (2), $$C(t) = A\left[\cos\omega_c t + \frac{mp}{2}\{\cos(\omega_c + \omega_m)t - \cos(\omega_c - \omega_m)t\}\right] \quad (4)$$

Provided, however, $mp = K \cdot a$, and represents the maximum modulation index. On the other hand, when (3) is substituted in (1) and expanded to the primary equation with the first kind of Bessel function, $$C(t) = AJ_0(mp)\left[\cos\omega_c t + \frac{J_1(mp)}{J_0(mp)}\{\cos(\omega_c + \omega_m)t - \cos(\omega_c - \omega_m)t\}\right] \quad (5)$$

From (4) and (5), the range which holds $$\frac{J_1(mp)}{J_0(mp)} = \frac{1}{2} mp \quad (6)$$

is considered to be the range satisfying $K \cdot f(t) << 1$.

Figure 6:
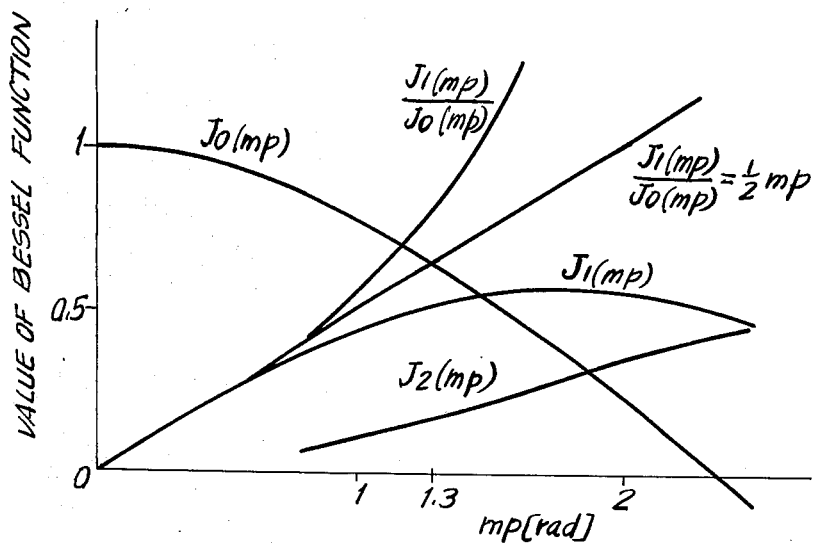
FIG. 6 shows changes in Bessel functions.

In studying the first kind of Bessel function, it is found from FIG. 6 that if $$mp \leq 1.3 \text{ or } mp \leq 1.5 \text{ for practical purposes} \quad (7),$$

then (6) holds with a fairly good approximation.

From the above consideration, it is clear that if the modulation index is beneath a certain value, then it may be PM modulated by a balanced modulator. It also becomes clear that multiplexing of PM signals by orthogonal phase modulation is also possible.

In further considering the maximum modulation index, mp upper limit is more or less determined visually. According to Japanese Patent Publication No. 56-51406 and Lay open print No. 53-41126, the luminance signal is PM modulated at $mp \leq 1.0$ (or $mp \leq 1.3$ for practical purposes) for allowing cross talk from the adjacent tracks. However, when one considers that the color signals have a narrower band width than the luminance signals, $mp \approx 1.5$ will suffice in practical terms. More in particular, when phase modulating with a balanced modulator, mp may further be increased than in conventional phase modulation because of the absence of secondary side band waves. A large mp is also allowed for still picture recording, since recording may be carried out to eliminate cross talk. When mp is large, S/N improves, but distortion increases. This distortion can be corrected.

When $A \sin \omega_c t$ and $A \cos \omega_c t$ are phase modulated by a balanced modulator which are in a perpendicular relation to each other by using two color difference signals (R−Y) and (B−Y) as modulation signals, the following two equations will hold:

$$C_R(t) = A \cos \omega_c t - AK_R \cdot E_{R-Y}(t) \sin \omega_c t \quad (8)$$

$$C_B(t) = A \sin \omega_c t + AK_B \cdot E_{B-Y}(t) \cos \omega_c t \quad (9)$$

wherein (R−Y) and (B−Y) are voltages respectively set at $E_{R-Y}$ and $E_{B-Y}$, and $K_R$ and $K_B$ are constants.

When demodulating $E_{R-Y}$ and $E_{B-Y}$ respectively and separately in (8) and (9), they may be synchronously detected as $$C_R(t) \times \sin \omega_c t, \text{ and } C_B(t) \times \cos \omega_c t.$$

However, if simply multiplexed as in $$C(t) = C_R(t) + C_B(t) \quad (10)$$

DC components cannot be completely eliminated because C(t) includes the carrier of the same phase as $\sin \omega_c t$ and $\cos \omega_c t$ even when either one of these phase reference signals is used for synchronous detection.

In order to eliminate the DC component mentioned above, $C_R(t)$ and $C_B(t)$ are so set for frequency-interleaving of each other. By using the vertical correlation of picture image signals, either one of $C_R(t)$ or $C_B(t)$ is phase inverted in 1 H so as to enable their separation by a comb filter at the time of reproduction, or further still a phase is advanced by 90 degrees for 1 H for one and delayed by 90 degrees for the other, so that $C_R(t)$ and $C_B(t)$ will be phase-shifted by 180 degrees relative to each other per 1 H for multiplexing. There are two methods of phase shifting; one is to phase shift the modulator output by ±180° and ±90°, and the other is to phase shift the carrier by ±180° and ±90°.

In FIG. 4, $$\begin{aligned} C(t) &= \pm C_R(t) + C_B(t) \\ &= \pm[A\cos\omega_c t - AK_R \cdot E_{R-Y}(t)\sin\omega_c t] + \\ &\quad [A\sin\omega_c t + AK_B \cdot E_{B-Y}(t)\cos\omega_c t] \end{aligned} \quad (11)$$

For demodulation, C(t) is delayed by 1 H because of the strong vertical correlation existing between adjacent horizontal scanning lines of the picture image signal, so that C(t) may be separated to $C_R(t)$ and $C_B(t)$ by addition and subtraction of the signals before and after the delay. After separation, they may be respectively synchronously detected. As it becomes $\pm C_R(t)$ in subtraction, the phase reference signal used in the synchronous detection is also phase inverted per 1 H to become $\pm \sin \omega_c t$. Such phase shift of phase reference signals per 1 H becomes necessary for, say, when $C_R(t)$ is advanced by 90 degrees as well as for delaying $C_B(t)$ by 90 degrees per 1 H. In other words, the phase shift angle for the phase reference signal is determined by those of $C_R(t)$ and $C_B(t)$ during recording. Said separation becomes incomplete if the respective subcarrier phases do not aligned in each horizontal scanning. Therefore, the frequency $\omega_c/2\pi$ of subcarriers is related to horizontal scanning frequency $f_H$. For a rotating disc, for instance, $\omega_c/2\pi = n \cdot f_H$ for 1 track/1 frame, and $\omega_c/2\pi = (n+\frac{1}{2})f_H$ for 1 track/1 field. Provided, n is a natural number.

Figure 7A:
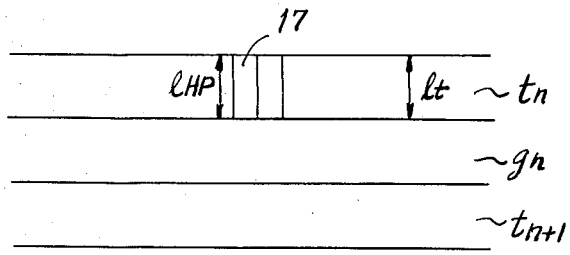
FIG. 7, consisting of (a)-(c), shows examples of recording/regenerating methods without cross talk.
Figure 7B:
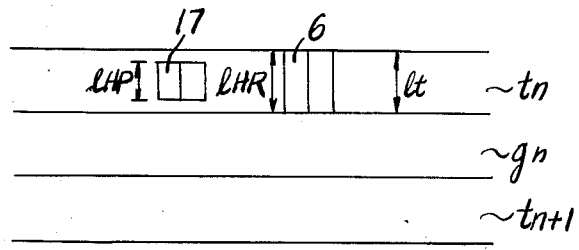
Figure 7C:
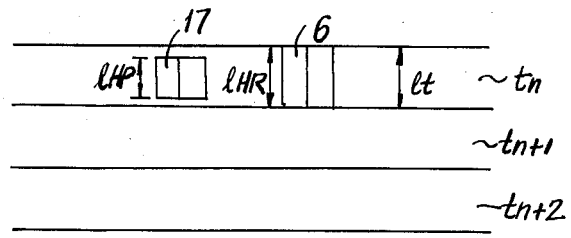

In magnetic recording of still picture images, there is generally no correlation among still pictures recorded in adjacent tracks with different image pickup units whether for frame recording or field recording. Thus, there should be no cross talk with other picture images on the adjacent track. Generally speaking, there is formed a guard band $g_n$ between the track $t_n$ and $t_{n+1}$ as shown in FIG. 7(a). However, still generally speaking, the scanning width $l_{HP}$ for reproducing magnetic head 17 is the same as the width lt of the recording track. In the case of the guard band shown in FIG. 7(a) with admittedly little cross talk, because of $l_{HP}=l_t$, if the reproducing head 17 deviates from the recoding track $t_n$, to that extent reproduced output becomes lower, thereby deteriorating S/N. This requires a tracking servo control with excellent precision; but if the reproducing head 17 becomes randomly deviated from the recording track $t_n$ during one rotation because of eccentric loading of the magnetic disc 7, this becomes a random deviation in the reproduction output, and the resulting random S/N lowering cannot be compensated. In order to remove such inconveniences, the relation between the scanning width $l_{HR}$ of the recording head 6 and $l_{HP}$ of the reproducing head 17 should be set as $$l_{HR} > l_{HP} \tag{12}$$

as shown in FIG. 7(b) or FIG. 7(c).

Take a magnetic disc of about 40 mm$\phi$ plastic film base, the track deviation at its worst becomes $\pm 20$ μm considering the thermal expansion, wet expansion and decentering. If the recording track width $l_t$ was set at 80 μm ($l_{HR}=80$ μm), and the scanning width $l_{HP}$ of the reproducing head 17 be 40 μm, a constant reproduction output with a simple tracking can be output. If the reproduction head width is 40 μm, sufficient S/N is obtainable with the present day technology. So long as the above equation (12) is satisfied, it does not matter whether a guard band is formed as in FIG. 7(b) or not, as in FIG. 7(c).

Figure 5:
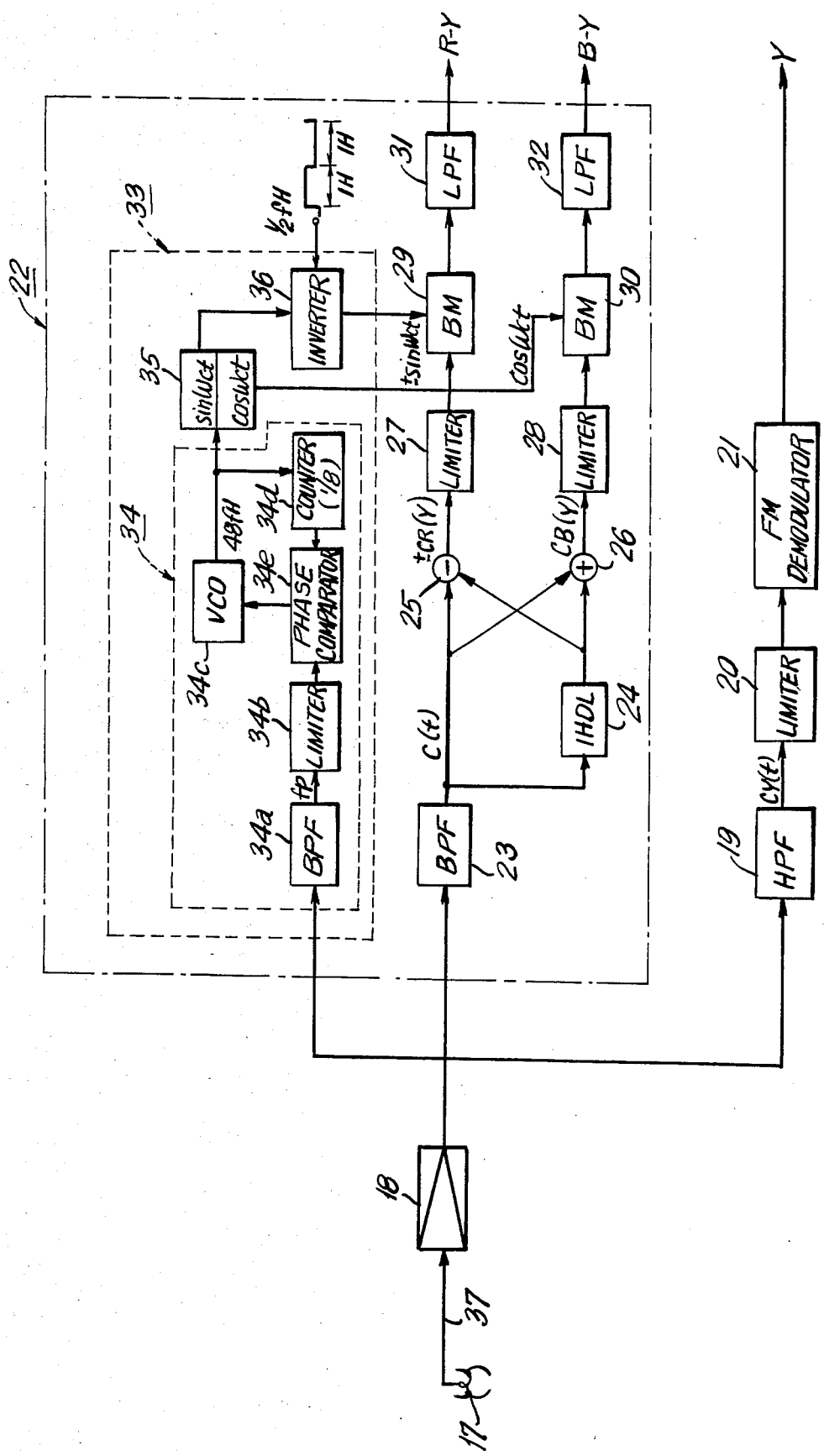
FIG. 5 a block diagram showing one embodiment of a regenerating system corresponding to that shown in FIG. 4.

FIG. 5 shows an embodiment of the reproduction system corresponding to the recording system of FIG. 4 wherein the reference numeral 17 denotes a magnetic head for reproduction, 18 a reproduction amplifier, 19 to 21 a high pass filter for separating FM luminance signals, an amplitude limiter, and an FM demodulator respectively, and 22 a demodulator circuit for multiplexed PM color signals. The demodulator circuit 22 of this embodiment comprises a band pass filter (BPF) for PM color signal extraction 23, a delay line for 1 horizontal scanning time (1HDL) 24, a subtractor 25, an adder 26, amplitude limiters 27 and 28, balanced modulators 29, 30, low pass filters 31, 32 and a phase reference signal generator 33. The phase reference signal generator 33 of this particular embodiment comprises a 48 $f_H$ oscillator 34, a phase shifter 35 and an inversion circuit 36. The oscillator 34 of this embodiment comprises a band pass filter (BPF) 34a for extracting 6 $f_H$ reference signals, an amplitude limiter 34b, a voltage control oscillator 34c, a counter 34d for $\frac{1}{8}$ frequency division, and a phase comparator 34e.

In FIG. 5, FM luminance signal $C_Y(t)$ among reproduced signals 37 is FM demodulated as in the prior art. Multiplexed PM color signals ($\pm C_R(t)+C_B(t)$) are separated to $\pm C_R(t)$ and $C_B(t)$ by the delay line 24, the subtractor 25 and the adder 26 after having been extracted by the band pass filter 23, and then input to balanced modulators (BM) 29 and 30 respectively after passing through the amplitude limiters 27 and 28. The phase reference signals given to each of the balanced modulators 29 and 30 are $\pm\sin \omega_c t$ and $\cos \omega_c t$, and are formed in the following manner: The output 48 $f_H$ of the voltage control oscillator 34c is frequency-divided by 8 at the counter 34d, and is phase-compared with the 6 $f_H$ reference signal f'$_P$ obtained by passing the output through the band pass filter 34a and the amplitude limiter 34b at the phase comparator 34e in order to control the phase of the oscillation output. From this oscillation output are formed $\sin \omega_c t$ and $\cos \omega_c t$ at the phase shifter 35, and $\cos \omega_c t$ is given as is to the balanced modulator 30 for B−Y demodulation. Sin $\omega_c t$ is passed through the inversion circuit 36 which is controlled by $\frac{1}{2}$ $f_H$ rectangular signal 38 inverting once per every 1 H to make it $\pm \sin \omega_c t$, and is given to a balanced modulator 29 for R−Y demodulation. When the output from each of the balanced modulators 29 and 30 is passed through the low pass filters 31 and 32, the carrier and component of higher order are removed and color signals of $E_{R-Y}(t)$ and $E_{B-Y}(t)$ are obtained.

We shall now discuss the phase reference signals. The phase reference signals necessary for synchronous detection must absorb time base deviations caused by the relative movement of the magnetic disc and the magnetic head at either the time of recording or of reproducing. In the embodiment shown in FIGS. 4 and 5, the 6 $f_H$ reference signal $f_P$ is recorded by frequency multiplexing along with FM luminance signals and PM color signals. At the time of demodulation, the 6 $f_H$ reproducing signal f'$_P$ is used to align the phase of the phase reference signal with the time base deviation. Said reference signal is set on the side lower than the PM color signal band as for 6 $f_H$, although it may be set between PM color signal zone and FM luminance signal zone. More concretely, if the subcarrier is set at about 1.3 MHz and the reference signal at the frequency twice thereof, then the design and circuit construction for the phase reference signal generator becomes simple when considering the jitters, phase lags or S/N. Other methods of obtaining phase reference signals are a method to provide an auxiliary track on the magnetic disc and recording either one of the subcarriers thereon; a method for using the composite signals of the first and the second subcarriers during the horizontal blanking period; or a method of phase control by detecting the rotational deviation of the disc driving motor of FG (frequency generator). With a method of using auxiliary track or FG, the subcarrier phase is controlled also during recording.

When one of PM color signals $C_R(t)$ is inverted alternately with $\pm C_R(t)$ per every 1 H as in the recording system shown in FIG. 4, unless the phase reference signals correctly respond and invert in reproduction demodulation as $+ \sin \omega_c t$ against $-C_R(t)$
  $- \sin \omega_c t$ against $+C_R(t)$, the demodulated color difference signals become inverted as $-(R-Y)$. Therefore, correct color picture image signals are not obtainable. Another method of inversion control for phase reference signals is to record special discrimination pulses with picture image signals at the time of recording. This recording of the special pulses is not so desirable. It would be more convenient if a simple and accurate inversion control of phase reference signals could be performed without taking the trouble of recording special discrimination pulses.

Figure 8:
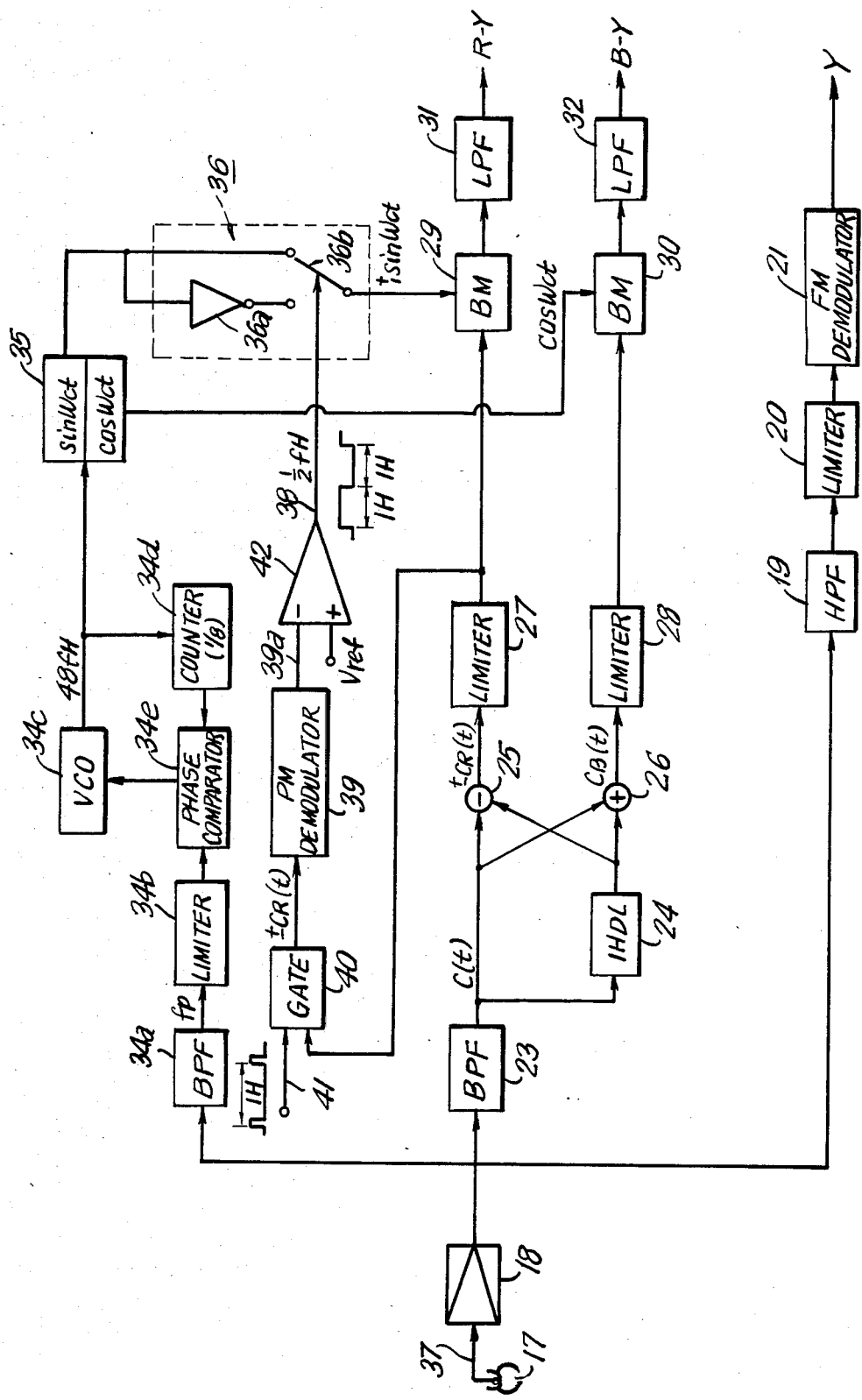
FIG. 8 another example of the regeneration system.

As shown in FIG. 8, one more PM demodulator 39 is added to the circuit shown in FIG. 5, and the signal $\pm C'_R(t)$ alone is extracted during the horizontal blanking by the gate circuit 40 from among the alternately inverting PM color signals $\pm C_R(t)$, signal $\pm C'_R(t)$ being PM demodulated by a signal of a prescribed phase, for instance, a phase reference signal $\cos \omega_c t$ for $C_B(t)$ demodulation. Thus, the control signal 38 for the inversion circuit 36 is to be formed from said PM demodulation output 39a. Alternately inverting PM color signal $\pm C_R(t)$ is generally expressed as $$\pm C_R(t) = \pm [A \cos \omega_c t - AK_R \cdot E_{R-Y}(t) \sin \omega_c t] \quad (12)$$

from (8), and has a phase which changes as in FIG. 9(a). However, in the absence of color signals during horizontal blanking time (no modulation), it becomes $$\pm C'_R(t) = \pm A \cos \omega_c t \quad (13)$$

and phase inverts only once per 1 H. Then, $\pm C'_R(t)$ is extracted by controlling the gate circuit 40 with the gate pulse 41 which becomes ON every 1 H during the horizontal blanking period $T_{BLK}$ as shown in FIG. 9(b), and PM demodulated with $\cos \omega_c t$ to obtain a demodulation output 39a which becomes positive or negative per every 1 H as shown in FIG. 9(c). When the pulse 39a is input into a comparator 42 having hysteresis characteristics, ½ $f_H$ pulse signal whose level deviates per every 1 H as shown in FIG. 9(d), is obtained. $V_{ref}$ represents a threshold value. The level of the pulse signal 38 always corresponds to $\pm C_R(t)$ by following the polarity of the demodulated output 39a during horizontal blanking which always corresponds to the alternately inverting PM color signal $\pm C_R(t)$. Therefore, it is possible to obtain discriminating pulse signals without recording special pulses. Furthermore, even when burst errors occur, the pulse signal 38 automatically returns to the level transition corresponding to $\pm C_R(t)$. In the example shown in FIG. 4, the inversion circuit 36 comprises an inverter 36a and a switch 36b, said switch 36b being switched corresponding to the level of pulse signals 38. In FIG. 8, the parts identical to those shown in FIG. 4 are given the same reference numerals in order to avoid redundancy in explanation.

FIG. 10 shows a PM demodulator 39, a gate circuit 40 and a concrete circuit for the comparator 42 which has hysteresis characteristics.

Figure 11:
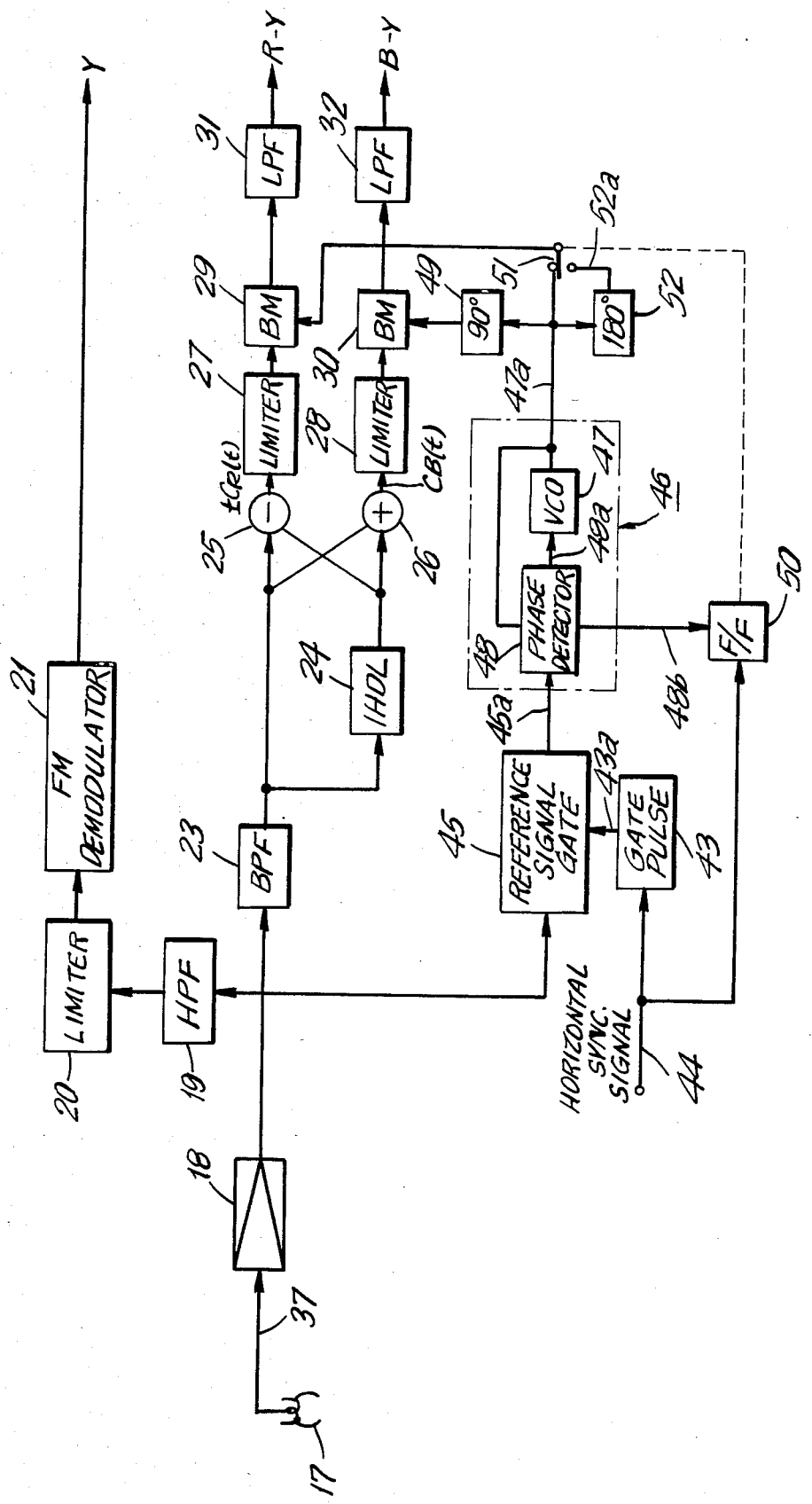
FIG. 11 is a block diagram showing still another embodiment of the regeneration system.

FIG. 11 shows a reproducing system corresponding to the recording system of FIG. 4 when phase reference signals are formed by an alternate method. Provided, however, the recording system does not require the counter 3 of FIG. 4. In FIG. 11, the parts identical to those shown in FIG. 5 are given the identical reference numbers in order to avoid redundancy in explanation.

In FIG. 11, a gate pulse circuit 43 inputs horizontal synchronous signals 44 to output pulses 43a of the width of horizontal blanking period, and the reference signal gate circuit 45 remains open while it receives the pulse 43a, and sends the burst reference signal (48 $f_H$) 45a to APC (automatic phase control) circuit 46. Since the horizontal blanking period for color signals lacks the signal component, the subcarrier phase becomes constant. Therefore, the output 45a of the reference signal gate circuit 45 is a mere composite of the first and second subcarriers. In APC circuit 46, the oscillation output 47a of VCO (voltage control oscillator) 47 is phase-compared with the reference signal 45a, which has been input, at a phase detector circuit 48, and its output 48a is used to control VCO 47 to obtain the output 47a of the same phase and frequency as the burst reference signals 45a. This oscillation output 47a is a continuous signal corresponding to the time changes. The oscillation output 47a passes a 90° phase shifter 49 and becomes a phase reference signal $\cos \omega_c t$ of a prescribed phase corresponding to the balanced modulator 30 for B−Y modulation. On the other hand, a flip-flop (F/F) 50 relies on horizontal synchronous signal 44 as a clock, and is reset by the signal 48b output by the phase detector circuit 48 as it detects the phase of burst reference signal 45a every time it is input. Accordingly, the output of the flip-flop is used to switch the switch 51 by every 1 H, and the output 47a directly from VCO and the output 52a which has passed through a 180° phase shifter (inversion circuit) 52 are alternately given to the balanced demodulator 29 for R−Y demodulation in order to obtain a phase reference signal of $\pm \sin \omega_c t$. This will achieve a stable demodulation which has absorbed time base changes. In the example of FIG. 11, one of the subcarriers becomes inverted at the time of recording to $\pm \sin \omega_c t$, the phase for the burst reference signal 45a becomes different by 90 degrees per every 1 H similarly to the burst signals in the PAL system. Therefore, it is not only stable against time-based changes, but it is possible to obtain signals 48b for correctly inverting the phase reference signal to $\pm \sin \omega_c t$ per 1 H from the phase detector circuit 48 of the APC circuit.

Figure 12A:
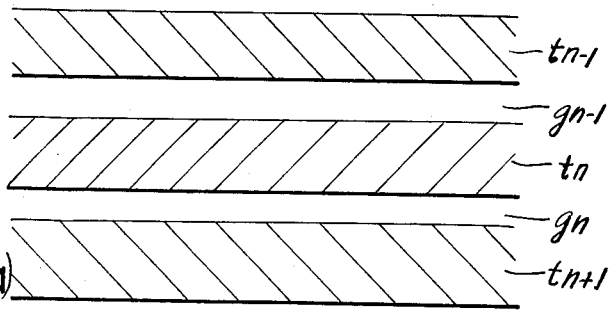
FIG. 12, consisting of (a)-(c), explains an inclined azimath system.
Figure 12B:
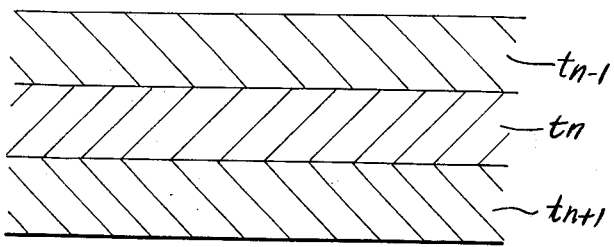
Figure 12C:
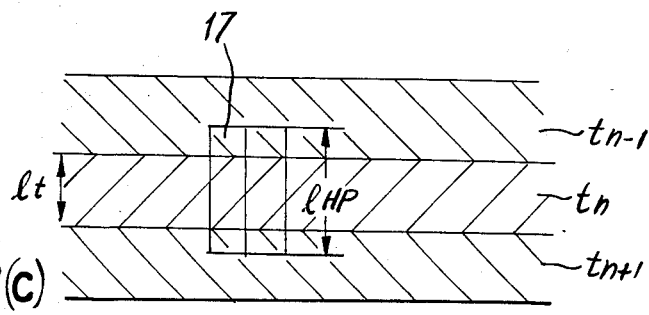
Figure 13:
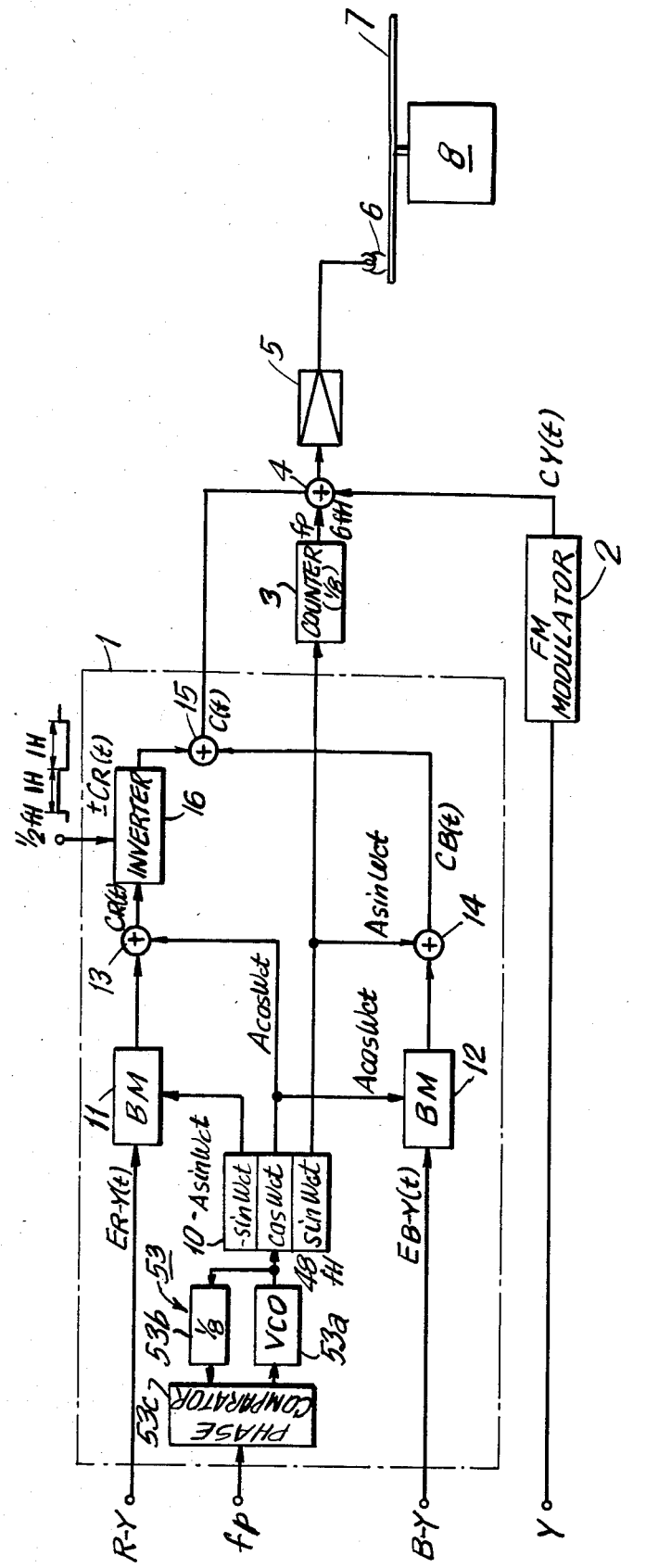
FIG. 13 is another embodiment to explain the recording system.

In the above going explanation, the luminance signals are FM modulated for recording. Therefore, if reproduction is conducted with the magnetic head overriding the adjacent track, interference between FM luminance signals of adjacent tracks will occur. If the subcarrier phases of PM color signals of adjacent tracks are not aligned, the colors for the reproduced picture image will also become mis-aligned. As shown by hatched lines in FIGS. 12(a) and 12(b), a so-called inclined azimath FM recording system is recommended so that a recording track $t_n$ will have a different azimath from the track $t_{n-1}$, or the track $t_{n+1}$ adjacent thereto. For the recording system, as shown in FIG. 13 for example, an oscillator 53 comprising VCO 53a, a counter 53b and a phase comparator 53c is recommended in place of the oscillator 9 in FIG. 4. From an already recorded track, reference signal f'$_P$ is reproduced by using an auxiliary head, or by recording this reference signal f'$_P$ in an auxiliary track, and then reproducing the same. If this reference signal f'$_P$ is input in the oscillator 53, it is possible to align the subcarrier phases between adjacent tracks. In the latter case, the center frequency of the carrier may be used as the reference signal because there are no signal interferences. The position of recording vertical and horizontal synchronous signals should preferably be aligned between adjacent tracks, but it suffices so long as the recording positions of the horizontal synchronous signals are aligned, even if the vertical synchronous signals are not aligned. As described above, if the positions of recording horizontal synchronous signals and of subcarriers were aligned between adjacent tracks and also if the inclined azimath system was adopted, it is possible to obtain reproduced picture images with less disturbances even if a tracking error occurs despite the efforts of preventing cross talk as shown in FIGS. 7(a), 7(b) and 7(c) in still picture video tape recording. In the case of movie recording, only the picture images with intense correlation with that of the adjacent track will overlap, presenting little problem in high density recording. In this case, the scanning width $l_{HP}$ of the reproducing head 17 may be made somewhat wider than the width of the recording track $l_T$ without any difficulties, and even with the tracking errors, the reproduction output is advantageously free from deviations. The parts in FIG. 13 which are identical to those of FIG. 4 are given the same numbers.

The above explanations were given in respect of various examples for recording the luminance signals by FM modulation. We shall now explain the instance where the luminance signals are PM modulated and recorded. Basically, it suffices if a PM modulator is used instead of an FM modulator in the recording system, and a PM demodulator in place of an FM demodulator in the reproducing system. PM modulator and PM demodulator can be realized quite simply by using a balanced modulator as in the modulation/demodulation of color signals.

When PM modulating and recording both color signals and luminance signals, we might consider the still picture recording apart from the movie recording. In the former, recording/reproduction is carried out, in principle, to restrain generation of cross talk by providing a guard band as shown in FIGS. 7(a), 7(b) and 7(c). Therefore, it is not necessarily required to align the recording positions of horizontal synchronous signals between adjacent tracks, or to align the phases of subcarriers for multiplexed PM color signals and of main carriers of the PM luminance signals. Naturally, it is not a requisite either to adopt an inclined azimath system.

On the other hand, high density recording becomes possible for the first time after the recording position for the horizontal synchronous color signals, the phases of respective subcarriers of multiplexed PM color signals, and the phase of the main carrier for the PM luminance signals between respective adjacent tracks are aligned. In this case, a plural number of picture images with extremely strong correlation alone will overlap when the regeneration head overrides the adjacent tracks. This will not cause any beat interferences. Therefore, there is absolutely no need to adopt the inclined azimath method, but it is more preferable to use a wider reproduction head which would override a plural number of tracks because of its bigger reproduction output and lower precision requirements for tracking. In the case of still picture taping, if the recording position of horizontal synchronous signals and the phases of respective carriers were aligned between adjacent tracks for recording, a tracking error, if any, would only cause overlapping of a plural number of picture images which have no correlation to each other without disturbance of the reproduced image.

Figure 14:
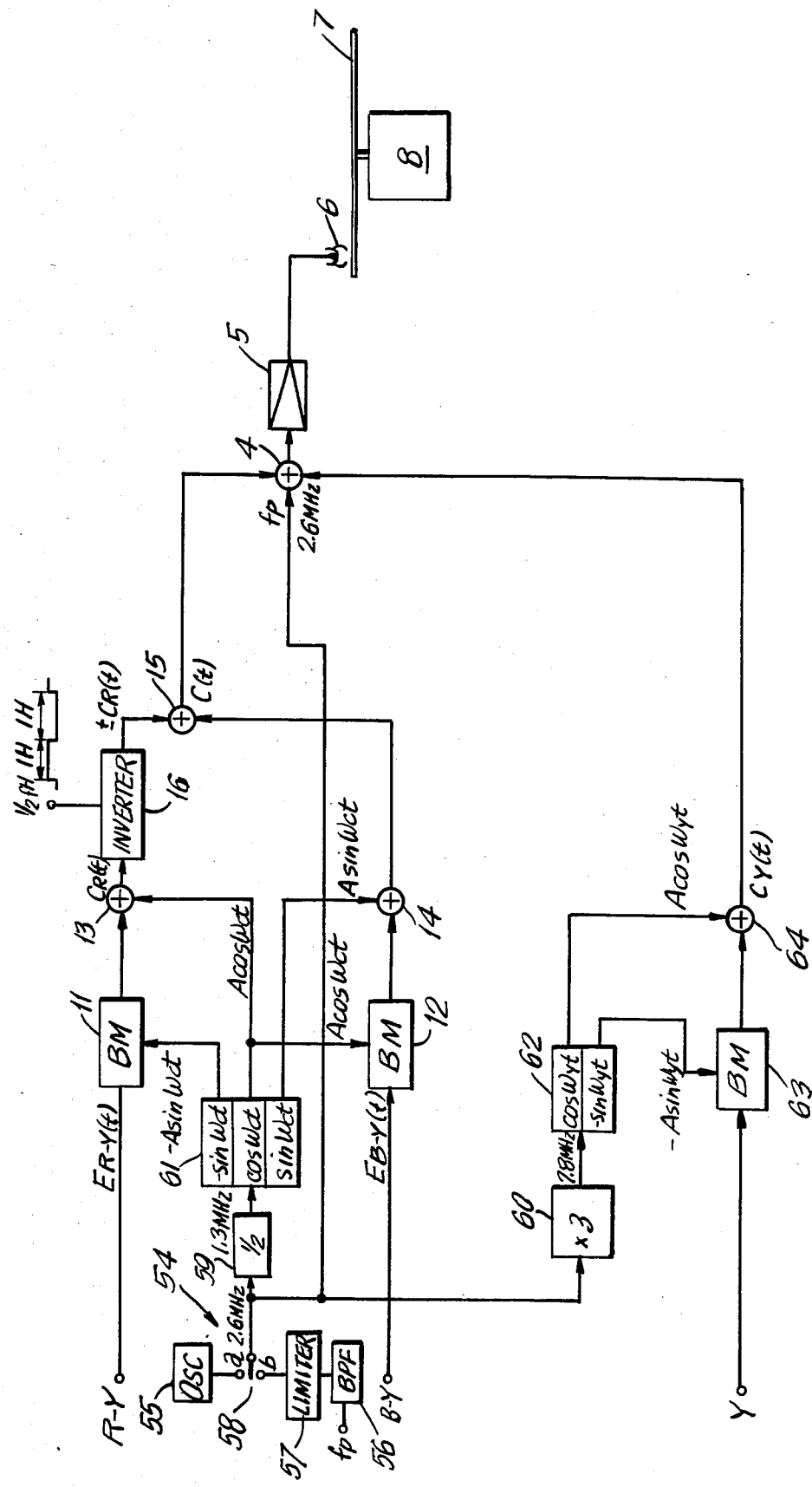
FIG. 14 shows still another embodiment.

FIG. 14 shows an example of a recording system for PM modulating and recording the luminance signals by using of balanced modulators.

Figure 15:
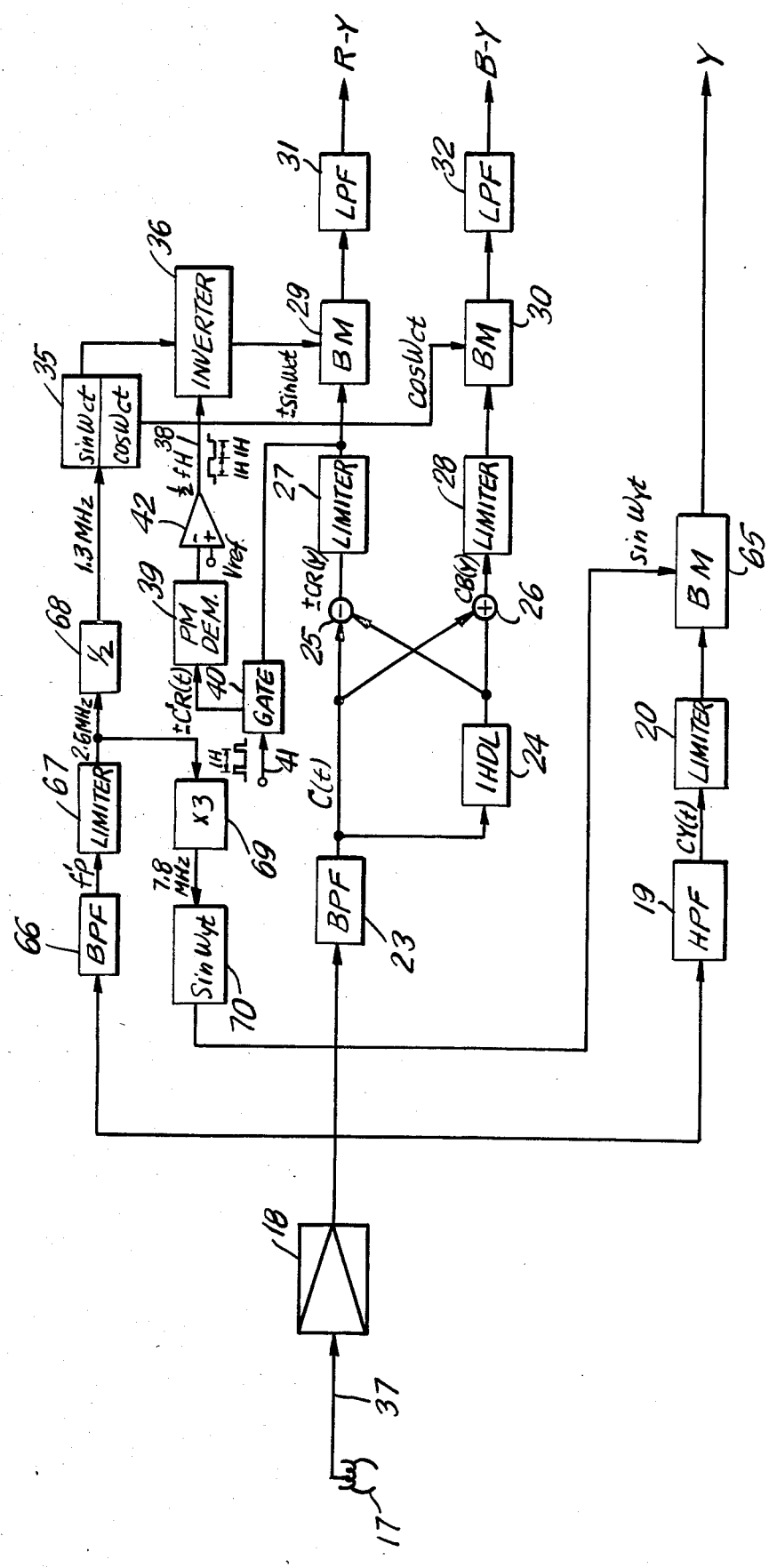
FIG. 15 is a block diagram of a regeneration system corresponding to that of FIG. 14.

FIG. 15 shows an example of a reproducing system therefor. Except for the PM modulator/recorder for the luminance signals, the parts shown in these two figures are substantially the same and like parts are given like numbers in order to eliminate redundancy in explanation.

The recording system shown in FIG. 14 is now explained. In the example, the center carrier for PM luminance signals is set at ca. 7.8 MHz, and the center carrier for PM color signals at a value 1/6th thereof (about 1.3 MHz) and the reference signals at ⅓ (about 2.6 MHz).

2.6 MHz indicates an empty frequency between the PM luminance signal band and the PM color signal band.

In FIG. 14, the reference number 54 denotes a carrier generating circuit, which comprises a 2.6 MHz oscillator 55, a 2.6 MHz band pass filter 56, and amplitude limiter 57, a change-over switch 58, a ½ frequency divider 59, a 3 multiplexing circuit 60, and phase shifters 61 and 62. The reference number 63 denotes a balanced modulator for PM modulating the luminance signals (Y), and 64 a composite circuit.

When recording on a new magnetic disc for the first time, the switch 58 at a contact point a is turned ON, a fixed frequency output of the oscillator 55 is used for PM modulation, and PM luminance signal $C_Y(t)$ and multiplexed PM color signals $C(t)$ along with the 2.6 MHz reference signal $f_P$ are multiple-recorded in one track. When recording in the next track, the switch 58 at a contact point b is turned ON, the reference signal $f'_P$ (2.6 MHz) is extracted from the track by using an auxiliary head (not shown) and BPF 56 to form a required carrier. In all the tracks, the phase for each carrier thus becomes aligned. The center frequency of each carrier may be recorded in the auxiliary track to be used as the reference signals.

FIG. 15 shows a regeneration system which is different from FIG. 4 or FIG. 8 in that PM luminance signals are demodulated at a balanced modulator 65, and that 2.6 MHz reference signals $f'_P$ are frequency-divided to 178 to form phase reference signal for PM color signal demodulation, and multiplexed by 3 to form a phase reference signal for PM luminance signal demodulation. In the figure, the reference number 66 denotes a band pass filter, 67 an amplitude limiter, 68 a ½ frequency divider, 69 a multiplication circuit, and 70 a phase shifter.

Figure 16A:
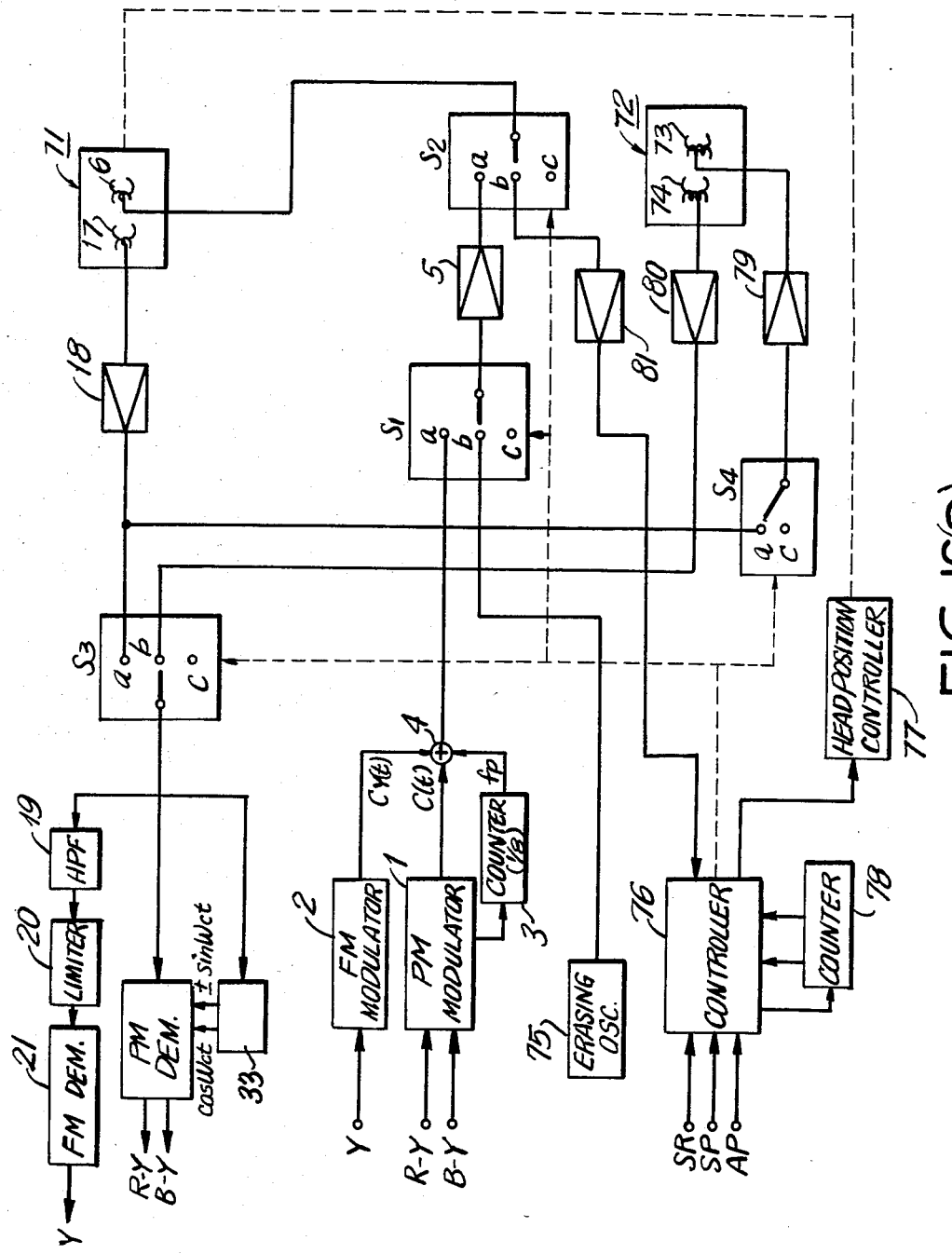
FIGS. 16(a) and 16(b) simplified block diagrams showing two devices provided with reproducing function for animation.

FIG. 16 shows an example of a magnetic disc video recording device to which a system of magnetic recording/reproducing still picture images by FM modulating luminance signals is applied in order to facilitate animation reproduction. Naturally, the explanation stands true for the case where still picture images are magnetically recorded/reproduced by PM modulating the luminance signals. The circuit shown in FIGS. 4, 5 and 8 is used also for the device shown in FIG. 16 and identical parts are therefore given identical numbers in order to eliminate redundant explanations. The example shown in FIG. 16(a) uses an auxiliary track formed on the magnetic disc 7, for instance, on the outermost periphery thereof for reproducing animations. The reference number 71 denotes a composite main head for still picture recording and is integrally formed with a wide head 6 and a narrow head 17 aligned in the direction of the track. The reference number 72 denotes a composite auxiliary head for reproducing animations which also includes a wide head 73 and a narrow head 74 aligned integrally in the direction of the track. Reference number 75 indicates an oscillator for erase signals, 76 a control member, 77 a control device for head positions, 78 a rotation counter for magnetic disc, 79 and 80 amplifiers for recording and regenerating, 81 an amplifier for extracting pilot signals for tracking, and $S_1$–$S_4$ switches for mode changes. The main head 71 for still picture recording is positioned on the desired track by moving the same in the radial direction of the magnetic disc, while the auxiliary head 72 for reproducing animations is fixedly positioned on the auxiliary track. The device shown in FIG. 16(a) has three kinds of modes; SR for still picture recording, SP for still picture reproducing and AP for animation reproducing. Mode commands are input to the control member 76. We shall now explain the operations of respective modes by referring to Table 1 assuming that the still picture images are recorded in the magnetic disc by 1 track/1 field. Table 1 shows the contact selections of the switches corresponding to the modes. The contact point c for each of the switches indicates OFF.

TABLE 1

| Mode | | Switch | | | |
|---|---|---|---|---|---|
| | | S1 | S2 | S3 | S4 |
| Head Feed | | c | b | c | c |
| Erase | | b | a | c | c |
| Still picture record SR | | a | a | c | c |
| Still picture regeneration SP | | c | c | a | c |
| Animation | [1] | c | c | a | a |
| Regeneration AP | [2] | c | c | b | c |

[Head Feed]

Switch S2 at contact point "b" alone is turned ON, and the other switches S1, S3 and S4 are turned OFF. From the regenerated output of the wide head 6 of the main head 71 is extracted a pilot signal for tracking to be fed to the control member 76, and the signal to position the main head 71 on the desired track is given to the head position control device 77, thereby to position the main head 71.

[Erase]

S1 at contact point "b" and S2 at contact point "a" become turned ON, and others are turned OFF. The output from the oscillator 75 is amplified by the amplifier 5 for recording, and an erasing current is passed to the wide head 6 of the main head 71. When always erasing before recording in each track, the erase mode is incorporated in the still picture recording mode SR.

[Still picture recording mode SR]

S1 and S2 at the contact point "a" are turned ON, and the others become turned OFF. At the composite circuit 4, FM luminance signals $C_Y(t)$, PM color signals C(t) and reference signals $f_P$ are multiplexed and amplified, and then the picture image signals corresponding to 1 field are recorded in the desired track by the wide head 6 of the main head 71.

[Still picture regeneration mode SP]

S3 at the contact point a is turned ON, and others become turned OFF. The reproduction output from the narrow head 17 of the main head 71 is amplified at the amplifier 18, and demodulated similarly as in FIG. 5 or FIG. 8. This will repeatedly obtain the picture image signals for 1 field portion to reproduce the still picture.

[Animation regeneration mode AP]

When the changing obect is continuously pictured by still recording, it is generally difficult to smoothly reproduce moving pictures. Basically, is suffices if reproduction is conducted a plural number of times for the same track, then moves on to the next track to repeat the same procedure subsequently. However, when the head moves from one track to another track, the reproduced picture image becomes blurred.

[1] First, S3 and S4 alone at the contact point "a" are turned ON, and others are turned OFF; the reproduction output from the narrow head 17 of the main head 71 is demodulated, and at the same time this output is amplified, and recorded in an auxiliary track by the wide head 73 of the auxiliary head 72. When the counter 78 detects one rotation of the magnetic disc,

[2] S3 at the contact point "b" alone becomes turned ON immediately to be reproduced from the auxiliary track which had recorded the record immediately preceding thereto by using the narrow head 74 of the auxiliary head 72. This reproduction is continued for the prescribed number of times of the magnetic discs, while the main head 71 is slowly sent to the next track. When the counter 78 detects the prescribed number of rotations, the operation mentioned in [1] is repeated to the next track. By repeating the above, the reproduced picture image does not become blurry during the time the head moves, and animation is reproduced excellently. The above explanation for FIG. 16(a) was made in respect of the field record of 1 track/1 field. The same is true for the frame record of 1 track/1 frame. When frame recording 2 tracks/1 frame, there should be provided two composite main heads 71 for still picture recording for the first field and the second field. There should also be provided two composite auxiliary heads 72 for the auxiliary track/animation reproduction for the first and the second fields, and each head may be electrically switched for each of the fields.

Figure 16B:
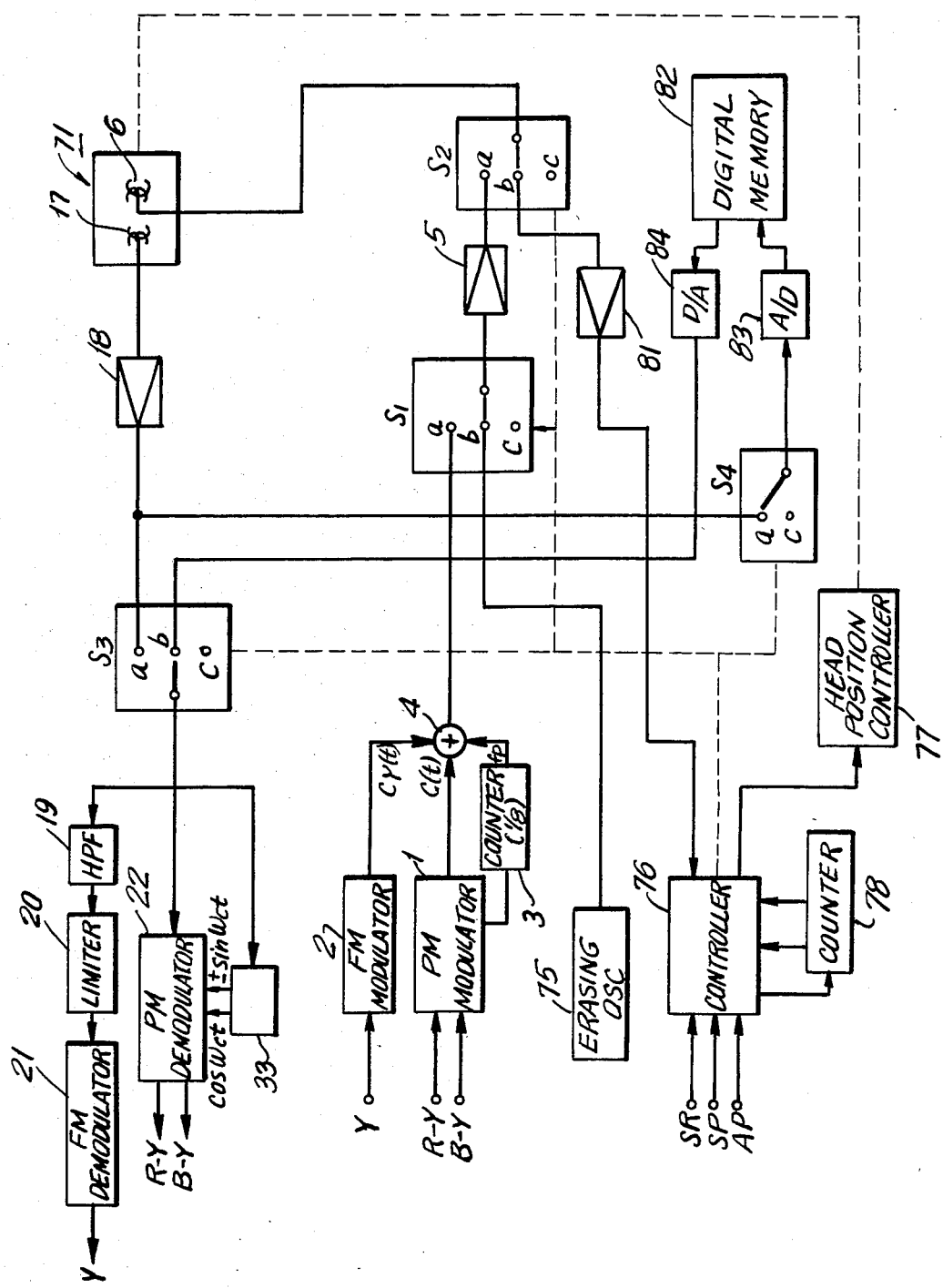

FIG. 16(b) shows an example where a digital memory 82 for 1 field or 1 frame is shown instead of the auxiliary track. This is the same as the example shown in FIG. 16(a) except for A/D converter 83 and D/A converter 84.

Figure 17:
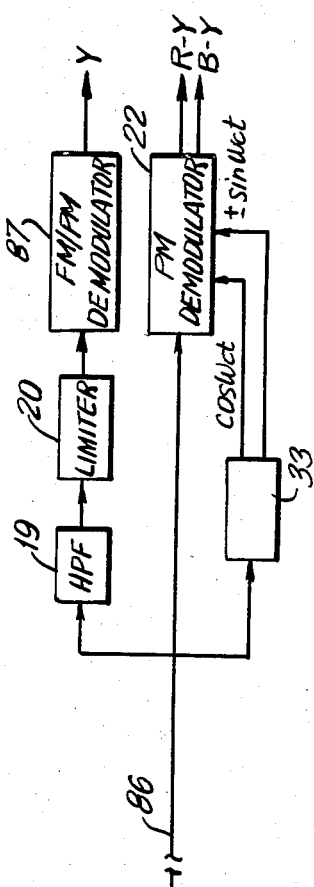
FIGS. 17 and 18 are the simplified block diagrams showing two embodiments of the transmission system.
Figure 18:
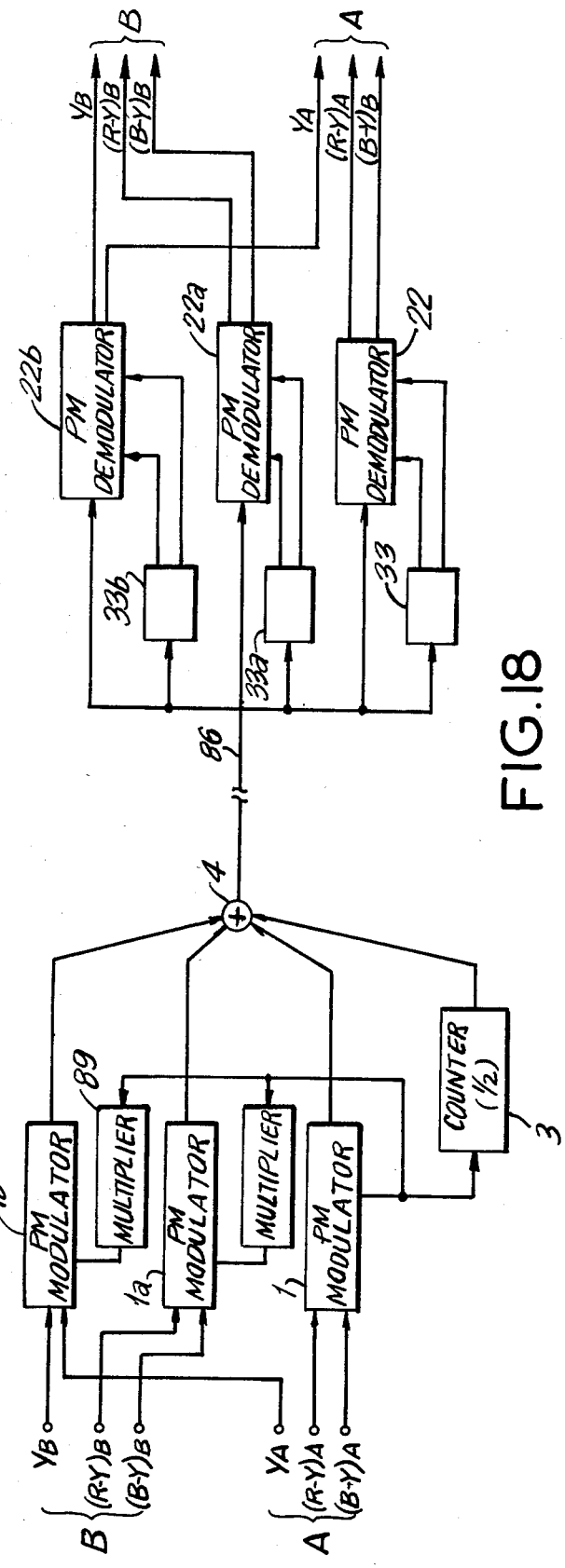

FIGS. 17 and 18 show the instances where the present invention is applied to a transmission system. In these figures, like parts shown in FIGS. 4, 5 and 8 are allotted like numbers to simplify the explanation.

Figure 1A:
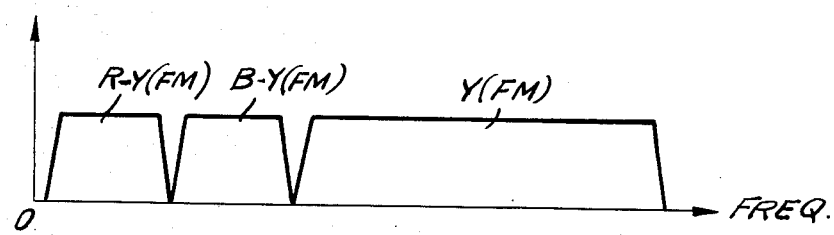
FIGS. 1(a) and 1(b) are diagrams to explain difficulties encountered in the prior art.
Figure 1B:
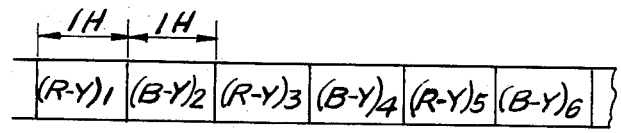
Figure 2:
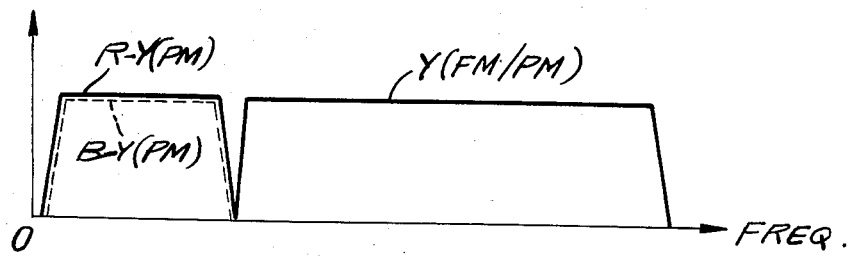
FIGS. 2 and 3 explain the present invention.

The embodiment shown in FIG. 17 shows transmission of one color picture image signal. In the figure, the reference number 85 denotes a PM or FM angle modulator for luminance signals, 86 a transmission line, and 87 a PM or FM demodulator for carrier luminance signals. The carrier luminance signal allotted to bands and multiplexed PM color signals as shown in FIG. 2 are transmitted over the transmission line 86.

Figure 3:
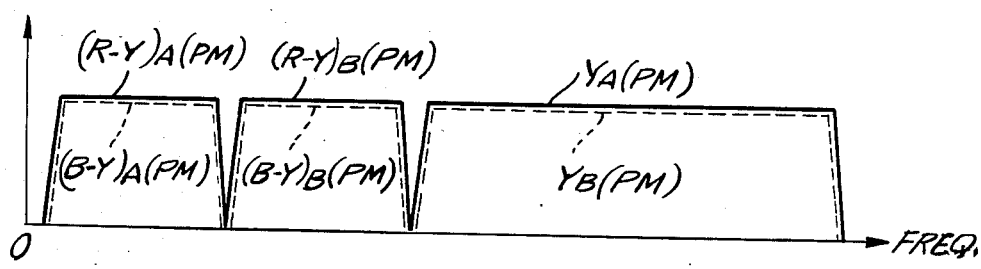

FIG. 18 shows an example of transmitting two color picture image signals A and B. As in FIG. 3, the band zones are allotted for occupation by respective signals and multiplexed by orthogonal phase modulation respectively. In the figure, the reference numbers 1a and 1b denote PM modulator circuits which are similar to the PM modulator circuit 1 except that the former do not have a carrier oscillator. They obtain the carrier at the multiplexers 88 and 89. The reference numbers 22a and 22 b denote PM demodulator circuits which are the same as the PM demodulator circuit 22 except for the pass band for the band pass filter, and 33a and 33b are the circuits with the same construction as the phase reference signal generating circuit 33 except for frequency.

Figure 19:
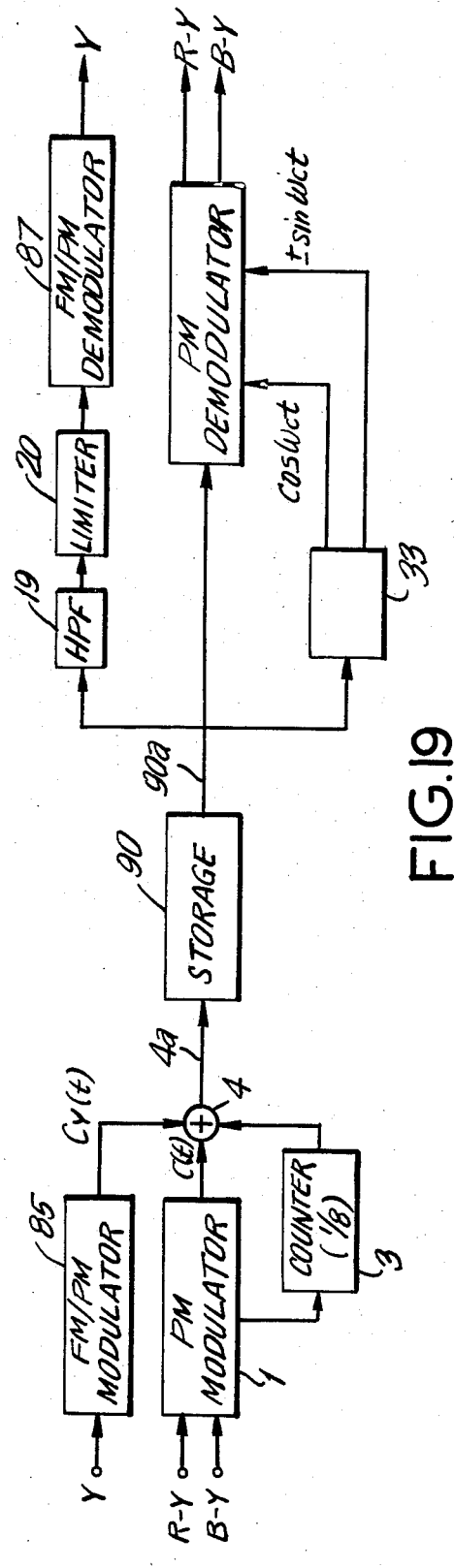
FIGS. 19 and 20 also simplified block diagrams of two examples of a storage device.
Figure 20:
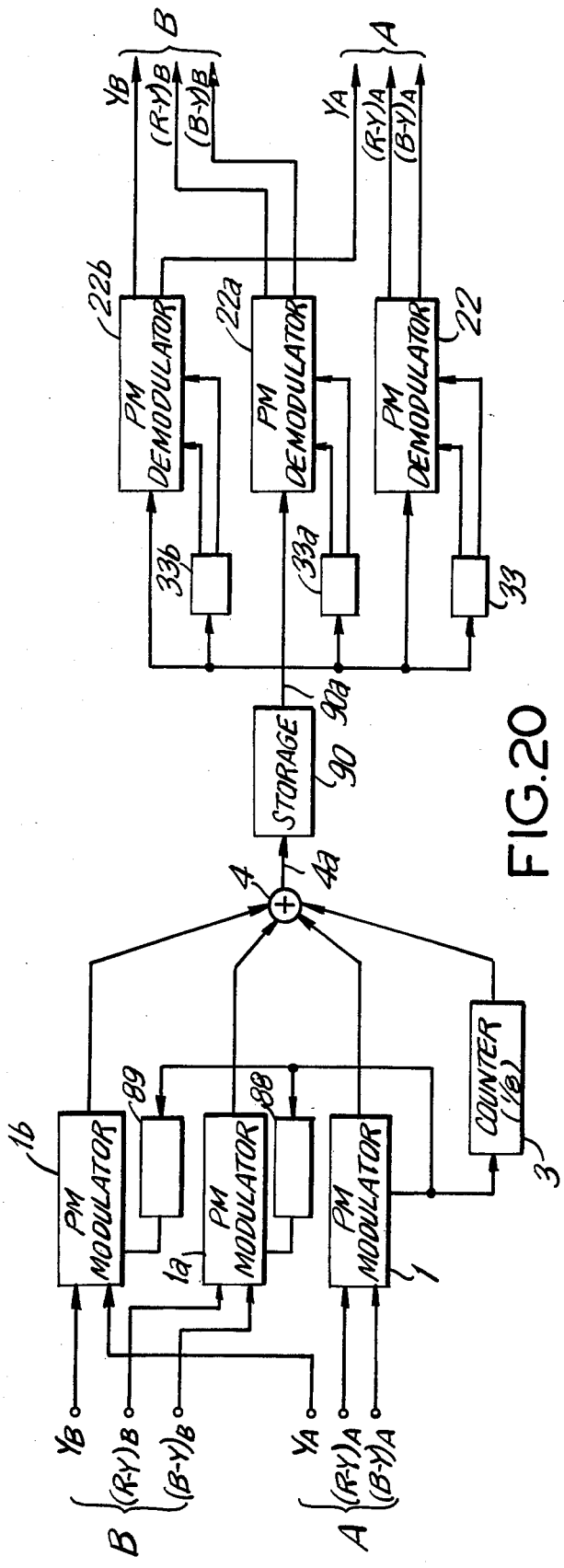

The present invention is now explained when applied generally to storing devices by way of FIGS. 19 and 20. The example shown in FIG. 19 corresponds to that of FIG. 17 and is the same except that the storing device 90 is used instead of the transmission line 86. The example of FIG. 20 corresponds to that of FIG. 18 except for the use of a storing device in place of the transmission line 86. The storing device requires an amplifier on both the input side and the output side as the need arises similarly as in the transmission system.

As a storing device 90, any of the like devices mentioned below may be used:

(a) A memory which converts the modulated signals 4a output from the composite circuit 4 into optical signals by an electric/optical converter (including LED and laser), and exposing the light sensitive material made of silver halogenide by optical signals in beam to optically record the data, and a memory to record the optical signals in beam by emitting the same on an optical magnetic recording medium.

(b) Various electrostatic capacity memories and semiconductor memories which store the output 4a of the composite circuit 4 as an electrical amount without converting the same to magnetic force or light, (c) Various digital magnetic memories which convert the output 4a of the composite circuit 4 into digital signals and store the same.

The optical magnetic memory, the semiconductor memory, and the magnetic memory basically convert the output 4a of the composite circuit 4 to digital signals by PCM or PNM systems, but other storage devices often can store the output as analog or digital signals. In such a case, the output 4a of the composite circuit 4 may be stored as an analog record without change, or it may be sampled once and stored as PAM, or even still may be converted to PWM and stored. Provided, however, the output 90a of the various storing devices 90 must be converted into base band signals or the same form as the output 4a of the composite circuit 4 by the detection circuit or D/A converter if they are sampled and recorded in PAM and PWM, or in PNM or PCM, except where the output 4a of the composite circuit 4 is analog recorded as a whole.

I claim:

1. An orthogonal phase modulation method comprising the steps of: phase modulating first and second carrier signals by two modulation signals respectively, wherein said two modulation signals being two color signals or two luminance signals, said first and second carrier signals having the same frequency of $(n/2)f_H$ (where n is an integer, and $f_H$ is a horizontal scanning frequency), said first and second carrier signals being orthogonal in phase to each other, and each having a phase modulation index equal to or less that 1.5 radian; inverting on of the two phase modulated signals every one horizontal scanning period (1H); combining said phase modulated signal alternately inverted with the other phase modulated signal not inverted; and supplying the combined phase modulated signals to an input means for receiving said combined signals.

2. An orthogonal phase modulation method as claimed in claim 1, wherein said phase modulation is achieved by: modulating said first and second carrier signals by said two modulation signals with the aid of first and second balanced modulators respectively; combining a modulated signal derived from the first balanced modulator with a carrier signal which has the same frequency as said first carrier signal and is delayed by 90° from said first carrier signal; and combining a modulated signal derived from the second balanced modulator with a carrier signal which has the same frequency as said second carrier signal and is delayed by 90° from said second carrier signal.

3. A method as claimed in claim 1, wherein said input means is a storing device.

4. A method as claimed in claim 2, wherein said input means is a storing device.

5. A method as claimed in claim 3, wherein said storing device includes a magnetic medium and a magnetic head moving relative thereto, and is a magnetic recording device for recording input signals.

6. A method as claimed in claim 4, wherein said storing device includes a magnetic medium and a magnetic head moving relative thereto, and is a magnetic recording device for recording input signals.

7. A method as claimed in claim 5, wherein said two modulation signals are two color signals of a television signal, and said magnetic recording device records by frequency division multiplexing said combined phase modulated color signals and a luminance signal of said television signal which is angle modulated on a main carrier signal.

8. A method as claimed in claim 6, wherein said two modulation signals are two color signals of a television signal, and said magnetic recording device records by frequency division multiplexing said combined phase modulated color signals and a luminance signal of said television signal which is angle modulated on a main carrier signal.

9. A method as claimed in claim 7, wherein the modulation method of said luminance signal is a phase modulation method, said main carrier signal for the luminance signal and said first and second carrier signals for two color signals are synchronized along with a relative movement between the magnetic head and the magnetic medium, and said magnetic recording device records the phase modulated luminance signal and said combined phase modulated color signals in such a way that at least recording positions of horizontal synchronous signals of the television signal will become aligned in adjacent tracks, and the phases of said main, first and second carrier signals will become aligned in adjacent tracks.

10. A method as claimed in claim 8, wherein the modulation method of said luminance signal is a phase modulation method, said main carrier signal for the luminance signal and said first and second carrier signals for two color signals are synchronized along with a relative movement between the magnetic head and the magnetic medium, and said magnetic recording device records the phase modulated luminance signal and said combined phase modulated color signals in such a way that at least recording positions of horizontal synchronous signals of the television signal will become aligned in adjacent tracks, and the phases of said main, first and second carrier signals will become aligned in adjacent tracks.

11. A method as claimed in claim 7, wherein the modulation method of said luminance signal is a frequency modulation method, said first and second carrier signals for two color signals are synchronized with the relative movement between the magnetic head and the magnetic medium, said magnetic recording device records the frequency modulated luminance signal and said combined phase modulated color signals in such a way that at least recording positions of horizontal synchronous signals of the television signal will become aligned in adjacent tracks, and the phases of said first and second carrier signals will become aligned in adjacent tracks, but azimuth is different in adjacent tracks.

12. A method as claimed in claim 8, wherein the modulation method of said luminance signal is a frequency modulation method, said first and second carrier signals for two color signals are synchronized with the relative movement between the magnetic head and the magnetic medium, said magnetic recording device records the frequency modulated luminance signal and said combined phase modulated color signals in such a way that at least recording positions of horizontal synchronous signals of the television signal will become aligned in adjacent tracks, and the phases of said first and second carrier signals will become aligned in adjacent tracks, but azimuth is different in adjacent tracks.

13. A method as claimed in claim 7, wherein said television signal is a signal of a still picture image.

14. A method as claimed in claim 8, wherein said television signal is a signal of a still picture image.

15. A method as claimed in claim 9, wherein said television signal is a signal of a still picture image.

16. A method as claimed in claim 10, wherein said television signal is a signal of a still picture image.

17. A method as claimed in claim 11, wherein said television signal is a signal of a still picture image.

18. A method as claimed in claim 12, wherein said television signal is a signal of a still picture image.

19. A method as claimed in claim 13, wherein the width of the recording track formed by said magnetic recording device is wider than the scanning width of the magnetic head for reproducing.

20. A method as claimed in claim 14, wherein the width of the recording track formed by said magnetic recording device is wider than the scanning width of the magnetic head for reproducing.

21. A method as claimed in claim 15, wherein the width of the recording track formed by said magnetic recording device is wider than the scanning width of the magnetic head for reproducing.

22. A method as claimed in claim 16, wherein the width of the recording track formed by said magnetic recording device is wider than the scanning width of the magnetic head for reproducing.

23. A method as claimed in claim 17, wherein the width of the recording track formed by said magnetic recording device is wider than the scanning width of the magnetic head for reproducing.

24. A method as claimed in claim 18, wherein the width of the recording track formed by said magnetic recording device is wider than the scanning width of the magnetic head for reproducing.

25. A method as claimed in claim 9, wherein said color picture image signals is a signal of a movie picture image.

26. A method as claimed in claim 10, wherein said color picture image signals is a signal of a movie picture image.

27. A method as claimed in claim 11, wherein said color picture image signals is a signal of a movie picture image.

28. A method as claimed in claim 12, wherein said color picture image signals is a signal of a movie picture image.

29. A method as claimed in claim 25, wherein the width of the recording track formed by said magnetic recording device is narrower than the scanning width of the magnetic head for reproducing.

30. A method as claimed in claim 26, wherein the width of the recording track formed by said magnetic recording device is narrower than the scanning width of the magnetic head for reproducing.

31. A method as claimed in claim 27, wherein the width of the recording track formed by said magnetic recording device is narrower than the scanning width of the magnetic head for reproducing.

32. A method as claimed in claim 28, wherein the width of the recording track formed by said magnetic recording device is narrower than the scanning width of the magnetic head for reproducing.

33. A method as claimed in claim 19, wherein in said magnetic recording device, the recording tracks are formed without gap on said recording medium.

34. A method as claimed in claim 20, wherein in said magnetic recording device, the recording tracks are formed without gap on said recording medium.

35. A method as claimed in claim 21, wherein in said magnetic recording device, the recording tracks are formed without gap on said recording medium.

36. A method as claimed in claim 22, wherein in said magnetic recording device, the recording tracks are formed without gap on said recording medium.

37. A method as claimed in claim 23, wherein in said magnetic recording device, the recording tracks are formed without gap on said recording medium.

38. A method as claimed in claim 24, wherein in said magnetic recording device, the recording tracks are formed without gap on said recording medium.

39. A method as claimed in claim 29, wherein in said magnetic recording device, the recording tracks are formed without gap on said recording medium.

40. A method as claimed in claim 30, wherein in said magnetic recording device, the recording tracks are formed without gap on said recording medium.

41. A method as claimed in claim 31, wherein in said magnetic recording device, the recording tracks are formed without gap on said recording medium.

42. A method as claimed in claim 32, wherein in said magnetic recording device, the recording tracks are formed without gap on said recording medium.

43. A method as claimed in claim 1, wherein said input means is a device for transmitting said combined phase modulated signals.

44. A method as claimed in claim 2, wherein said input means is a device for transmitting said combined phase modulated signals.

45. A method as claimed in claim 43, wherein said two modulation signals are two color signals of a television signals, and said transmission device transmits by frequency division multiplexing said combined phase modulated color signals and a luminance signal of the television signal which is angle modulated on a main carrier signal.

46. A method as claimed in claim 44, wherein said two modulation signals are two color signals of a television signal, and said transmission device transmits by frequency division multiplexing said combined phase modulated color signals and a luminance signal of the television signal which is angle modulated on a main carrier signal.

47. A method as claimed in claim 43, wherein said two modulation signals are two luminance signals of two television signals, and said transmission device transmits said combined phase modulated luminance signals and four color signals of said two television signals, each of which is arbitrarily angle modulated on a carrier signal.

48. A method as claimed in claim 44, wherein said two modulation signals are two luminance signals of two television signals, and said transmission device transmits said combined phase modulated luminance signals and four color signals of said two television signals, each of which is arbitrarily angle modulated on a carrier signal.

49. A demodulation method for an orthogonal phase modulated signal comprising the steps of: receiving said orthogonal phase modulated signal from an input means, said signal being achieved by phase modulating first and second carrier signals by two modulation signals respectively, wherein said two modulation signals are two color signals or two luminance signals, said first and second carrier signals having the same frequency of $n/2f_H$ (where n is an integer, and $f_H$ is a horizontal scanning frequency), said first and second carrier signals being orthogonal in phase to each other, and each having a phase modulation index equal to or less than 1.5 radian; inverting one of the two phase modulated signals every one horizontal scanning period (1H); combining said phase modulated signal alternately inverted with the other phase modulated signal not inverted; and supplying as said orthogonal phase modulated signal, the combined phase modulated signals to said input means; delaying said orthogonal phase modulated signal by a time of one horizontal scanning period (1H); separating into two phase modulated signals from said orthogonal phase modulated signal by the addition of the delayed orthogonal phase modulated signal and the non-delayed orthogonal phase modulated signal, and by the subtraction of said two orthogonal phase modulated signals; and demodulating said separated two phase modulated signals, respectively, by phase reference signals of which phases shift similarly to those of said first and second carrier signals in modulation, respectively.

50. The demodulation method as claimed in claim 49, wherein said input means is a storing device.

51. The demodulation method as claimed in claim 50, wherein said storing device includes a magnetic medium and a magnetic head which moves relative thereto, and is a magnetic recording device recording input signals.

52. The demodulation method as claimed in claim 51, wherein said two modulation signals are two color signals of a television signal, in said magnetic medium are recorded by frequency division multiplexing said combined phase modulated color signals and a luminance signal of the television signal which is angle modulated on a main carrier signal, and a combined phase modulated color signal obtained by extracting from an output of said magnetic head are demodulated.

53. The demodulation method as claimed in claim 52, wherein said luminance signal to be stored in said magnetic medium is phase modulated on said main carrier signal, and in said magnetic medium are recorded by frequency division multiplexing said combined phase modulated color signals and said phase modulated luminance signal in such a state that recording positions of at least horizontal synchronous signals of said television signal are aligned in adjacent tracks and the phase of said main, first and second carrier signals are respectively aligned in adjacent tracks.

54. The demodulation method as claimed in claim 52, wherein said luminance signal to be stored in said magnetic medium is frequency modulated, and in said magnetic medium or recorded by frequency division multiplexing said combined phase modulated color signals and said frequency modulated luminance signal in such a state that recording positions of at least horizontal synchronous signals of said television signal are aligned in adjacent tracks, but azimuth is different in adjacent tracks.

55. The demodulation method as claimed in claim 52, wherein said television signal recorded in said magnetic medium is a signal of a still picture image.

56. The demodulation method as claimed in claim 53, wherein said television signal recorded in said magnetic medium is a signal of a still picture image.

57. The demodulation method as claimed in claim 54, wherein said television signal recorded in said magnetic medium is a signal of a still picture image.

58. The demodulation method as claimed in claim 55, wherein the scanning width of said reproducing head is narrower than the width of the recording track formed on the magnetic medium.

59. The demodulation method as claimed in claim 56, wherein the scanning width of said reproducing head is narrower than the width of the recording track formed on the magnetic medium.

60. The demodulation method as claimed in claim 57, wherein the scanning width of said reproducing head is narrower than the width of the recording track formed on the magnetic medium.

61. The demodulation method as claimed in claim 53, wherein said television signal recorded in said magnetic medium is a signal of a movie picture image.

62. The demodulation method as claimed in claim 54, wherein said television signal recorded in said magnetic medium is a signal of a movie picture image.

63. The demodulation method as claimed in claim 61, wherein the scanning width of said reproducing head is wider than the width of the recording track formed on the magnetic medium.

64. The demodulation method as claimed in claim 62, wherein the scanning width of said reproducing head is wider than the width of the recording track formed on the magnetic medium.

65. The demodulation method as claimed in claim 58, wherein recording tracks are formed closely to each other on said magnetic medium.

66. The demodulation method as claimed in claim 59, wherein recording tracks are formed closely to each other on said magnetic medium.

67. The demodulation method as claimed in claim 60, wherein the recording tracks are formed closely to each other on said magnetic medium.

68. The demodulation method as claimed in claim 63, wherein the recording tracks are formed closely to each other on said magnetic medium.

69. The demodulation method as claimed in claim 64, wherein the recording tracks are formed closely to each other on said magnetic medium.

70. The demodulation method as claimed in claim 49, wherein said input means is a device for transmitting said combined phase modulated signals.

71. The demodulation method as claimed in claim 70, wherein said two modulation signals are two color signals of a television signal, and said transmission device transmits by frequency division multiplexing the combined phase modulated color signals and a luminance signal of the television signal which is angle modulated on a main carrier signal.

72. The demodulated method as claimed in claim 71, wherein said two modulation signals are respectively luminance signals of two television signals, and said transmission device transmits the combined phase modulated luminance signals and four color signals of the two television signals, each of which is arbitrarily angle modulated on a carrier signal.

73. The demodulation method as claimed in any one of claims 49 to 72, wherein a phase of the first reference signal for demodulating said phase modulated signal separated by addition is constant, and a phase of the second reference signal for demodulating said phase modulated signal separated by subtraction is inverted every horizontal scanning period (1H), said alternately phase inverted second reference signal is obtained by demodulating an alternatingly inverting PM signal, which signal is said phase modulated signal separated by subtraction with the aid of another constant phase reference signal during each horizontal blanking period only; on the basis of said demodulated output creating a phase signal of $\frac{1}{2}f_H$ (where $f_H$ is a horizontal scanning frequency) which repeats a level transition every horizontal scanning period (1H); and controlling the phase inversion of said second reference signal according to the level transition of said pulse signal.

74. The demodulation method as claimed in claim 73, wherein said pulse signals are created by inputting said demodulation output of alternatingly inverting PM signals during the horizontal blanking period into a comparator having hysteresis.

* * * * *